United States Patent
Reidy et al.

(10) Patent No.: US 7,484,363 B2
(45) Date of Patent: Feb. 3, 2009

(54) WIND ENERGY HARNESSING APPARATUSES, SYSTEMS, METHODS, AND IMPROVEMENTS

(75) Inventors: Michael T. Reidy, Mesa, AZ (US); Hari S. Iyer, Scottsdale, AZ (US); Jarmo Monttinen, Mesa, AZ (US)

(73) Assignee: Michael Reidy, Mesa, AZ (US)

( * ) Notice: Subject to any disclaimer, the term of this patent is extended or adjusted under 35 U.S.C. 154(b) by 233 days.

(21) Appl. No.: 11/584,409

(22) Filed: Oct. 19, 2006

(65) Prior Publication Data

US 2007/0138797 A1   Jun. 21, 2007

Related U.S. Application Data

(60) Provisional application No. 60/729,053, filed on Oct. 20, 2005.

(51) Int. Cl.
*F03B 13/10* (2006.01)
*H02K 7/18* (2006.01)

(52) U.S. Cl. .............................. 60/398; 290/44; 415/62; 416/120

(58) Field of Classification Search .................. 60/398; 290/44; 415/62, 66; 416/120, 175, 201 A
See application file for complete search history.

(56) References Cited

U.S. PATENT DOCUMENTS

| | | | |
|---|---|---|---|
| 138,593 A | 5/1873 | Straub | |
| 756,372 A | 4/1904 | Johnson | |
| 833,184 A | 10/1906 | Terzian | |
| 1,025,428 A | 5/1912 | Stanschus | |
| 1,345,022 A | 6/1920 | Oliver | |
| 1,471,095 A | 10/1923 | Bonetto | |
| 1,556,715 A * | 10/1925 | Riggs | ........................ 416/120 |
| 1,783,669 A | 12/1930 | Oliver | |
| 1,876,595 A * | 9/1932 | Beldimano | ................... 290/44 |
| 2,517,135 A | 8/1950 | Rudisill | |
| 2,616,506 A | 11/1952 | Mathias | |
| 3,883,750 A | 5/1975 | Uzzell, Jr. | |
| 4,021,135 A | 5/1977 | Pedersen et al. | |
| 4,075,500 A | 2/1978 | Oman et al. | |
| 4,079,264 A | 3/1978 | Cohen | |
| 4,087,196 A | 5/1978 | Kronmiller | |
| 4,132,499 A | 1/1979 | Igra | |
| 4,140,433 A | 2/1979 | Eckel | |
| 4,162,410 A | 7/1979 | Amick | |
| 4,191,505 A | 3/1980 | Kaufman | |

(Continued)

FOREIGN PATENT DOCUMENTS

WO   WO 2004011799 A1 *   2/2004

*Primary Examiner*—Thomas E Lazo
(74) *Attorney, Agent, or Firm*—Bryan Cave LLP

(57) ABSTRACT

Improvements to wind farms and wind generators for harnessing wind energy or generating electricity from wind. Secondary wind turbines are provided at particular locations within a wind farm to generate additional electricity, in some embodiments, using a common electrical power collection system. Enclosures or venturis may surround wind turbines to facilitate mounting close to the ground. Venturis may accelerate wind speed through the turbine and may have a particular shape, may be made of particular materials arranged in particular ways, or both. In different embodiments, wind turbines may be axial-flow horizontal-axis turbines, or may be Savonius turbines, as examples. And in some embodiments, wind turbines may be combined with other power production equipment, such as solar power equipment, for instance.

22 Claims, 8 Drawing Sheets

U.S. PATENT DOCUMENTS

| | | |
|---|---|---|
| 4,234,289 A | 11/1980 | Lebost |
| 4,275,989 A | 6/1981 | Gutierrez Atencio |
| 4,295,783 A | 10/1981 | Lebost |
| 4,411,588 A | 10/1983 | Currah, Jr. |
| 4,474,529 A | 10/1984 | Kinsey |
| 4,499,034 A | 2/1985 | Mcallister, Jr. |
| 4,543,042 A | 9/1985 | Lange |
| 4,600,360 A | 7/1986 | Quarterman |
| 4,616,973 A | 10/1986 | Souchik, Jr. |
| 4,720,640 A | 1/1988 | Anderson et al. |
| 4,960,363 A | 10/1990 | Bergstein |
| 5,103,646 A | 4/1992 | Fini |
| 5,332,354 A | 7/1994 | Lamont |
| 5,380,149 A | 1/1995 | Valsamidis |
| 5,457,346 A | 10/1995 | Blumberg et al. |
| 5,494,407 A | 2/1996 | Benesh |
| 5,503,530 A | 4/1996 | Walters |
| 5,599,172 A | 2/1997 | McCabe |
| 5,646,343 A * | 7/1997 | Pritchard ................ 73/170.08 |
| 5,852,331 A | 12/1998 | Giorgini |
| 5,947,678 A | 9/1999 | Bergstein |
| 6,041,596 A | 3/2000 | Royer |
| 6,069,409 A | 5/2000 | Fowler et al. |
| 6,242,818 B1 | 6/2001 | Smedley |
| 6,246,126 B1 | 6/2001 | Van Der Veken et al. |
| 6,465,899 B2 | 10/2002 | Roberts |
| 6,472,768 B1 | 10/2002 | Salls |
| 6,538,340 B2 | 3/2003 | Elder |
| 6,666,650 B1 | 12/2003 | Themel |
| 6,710,468 B1 | 3/2004 | Marrero O'Shanahan |
| 6,749,393 B2 | 6/2004 | Sosonkina |
| 6,756,696 B2 | 6/2004 | Ohya et al. |
| 2003/0025335 A1 | 2/2003 | Elder |

* cited by examiner

WIND ENERGY HARNESSING APPARATUSES, SYSTEMS, METHODS, AND IMPROVEMENTS

CLAIM OF PRIORITY

This patent application claims priority to, and incorporates by reference, U.S. provisional patent application 60/729,053, titled: Venturi Wind Generator, by Mike Reidy, which was filed on Oct. 20, 2005.

FIELD OF INVENTION

This invention relates to apparatuses, systems, and methods for harnessing renewable sources of energy including wind energy, and improvements thereto. Particular embodiments relate to wind turbines and wind farms for producing electricity from wind energy.

BACKGROUND OF THE INVENTION

Wind energy has been harnessed for centuries and used for a variety of useful purposes including propelling sailing ships to newly discovered continents, grinding grain, pumping water, and generating electricity. In recent times, large propeller-type horizontal axis turbines have been mounted on towers and used to turn electrical generators to provide a portion of the power for a large electrical distribution grid. Significant numbers of these wind turbines have been located in particular areas with high average wind speeds to form wind farms with considerable generating capability. Wind turbines have also been used to generate electricity in off-grid applications such as remote sites.

Wind energy is a potential substitute for at least a portion of the power generated by burning fossil fuels in conventional power plants, and use of wind energy instead of fossil fuels reduces the production of atmospheric pollution that otherwise would result from burning fossil fuels. In addition to the traditional pollutants from burning of fossil fuels, such as hydrocarbons, carbon monoxide, particulates, and acid rain, as examples, use of wind energy reduces the production of greenhouse gasses (i.e., carbon dioxide), in comparison with fossil fuels, and the contribution to the risks and potential harm associated with global warming. Further, use of wind energy reduces the need for the sacrifice of land for open pit mining and the risk to underground workers associated with underground mining of fossil fuels such as coal, or nuclear reactor fuels such as uranium, as examples. Use of wind energy instead of nuclear power also helps to avoid the risk of accidents and terrorist acts, as well as the long-term commitment of future generations associated with the production of radioactive waste.

According to the American Wind Energy Association, the U.S. Department of Energy has estimated that the wind energy potential in the U.S., for example, exceeds the total U.S. electrical consumption today. However, certain locations are far better than others for locating devices that harness wind energy, and available locations with adequate and relatively consistent wind speeds are limited. Further, state-of-the-art wind turbines usually must be spaced apart from one another by a fairly substantial distance to avoid overly impacting the flow of the wind to adjacent turbines. Consequently, the number of wind turbines that have been installed in a particular area of land has been rather limited. Thus, a need exists, or potential for benefit, to be able to improve the power production capability of a new or existing wind farm, or of a particular area of available land. Further, needs and potential for benefit exist for a wind farm that allows greater power production per area of land, more wind turbines per area of land, less interference between adjacent wind turbines, or wherein adjacent turbines improve wind speeds through each other, at least in some cases, rather than reducing wind speeds through each other.

Additionally, prior art horizontal-axis wind turbines are typically mounted on a tall tower. In addition to accessing higher wind speeds, the height of traditional wind turbines reduces or avoids risk to people, livestock, and wildlife, that may be on or near the ground. But towers are expensive to build and, at least in some cases, their height may be objectionable, for example, for obstructing a view. Thus, needs and potential for benefit exist for a wind turbine that will work well near the ground without putting people, livestock, or wildlife at excessive risk. In addition, flying birds are often killed or injured by traditional exposed wind turbines, and needs and potential for benefit exist, especially in certain locations, for wind turbines that protect birds from harm or that reduce the risk to birds inhabiting or passing through the area.

Further, due to the large size of the blades, and limitations on tip speeds, for example, prior art horizontal-axis wind turbines typically require a speed increaser between the turbine and the generator. Speed increasers have equipment costs, frictional losses, maintenance requirements, and risks of breakdown associated with them. Large blades are also an expensive component of existing wind turbines, and require high towers, which are another expensive component. Thus, needs and potential for benefit exist for a wind turbine in which the propeller turns at a higher speed so that a speed increaser is not required, need not increase the speed as much (e.g., proportionally), or need not handle as much torque (e.g., be as large), particularly while meeting other needs and potential areas for benefit. Needs and potential for benefit also exist for a wind turbine having smaller blades.

Still further, wind energy production has been increasing dramatically around the world in recent years. In response to the demand, installed costs for horizontal-axis wind turbines have increased on a per KWH basis as the best sites have been utilized, for example. In addition, increasing demand on limited wind turbine production capacity has resulted in both increases in cost and delays in obtaining specialized wind turbine equipment. As a result, needs and potential for benefit exist for alternative configurations of wind turbines that utilize different construction methodologies, that require different construction facilities, that compliment rather than competing directly with existing horizontal-axis wind turbine designs, and that are competitive with prior art technology on a cost per KWH basis, delivery time basis, or both. Furthermore, needs and potential for benefit exist for alternative configurations of wind turbines that facilitate faster or less expensive manufacturing and implementation of wind energy production capability on a worldwide basis.

Even further, structures have been proposed for focusing wind onto a turbine. U.S. Pat. No. 6,710,468 (Marreo O'Shanahan) concerns a wind-channeling conduit with a rotor within a narrowing in the conduit. U.S. Pat. No. 1,471,095 (Bonetto) shows two funnels 16 and 17 between which are blades 27 which turn a shaft 29. And U.S. Pat. No. 3,883,750 (Uzzell) shows a fan within a venturi, while U.S. Pat. No. 4,021,135 (Pedersen) shows a rotor 14 within a cowling 17. However, needs and potential for benefit exist for a venturi that has a shape that further reduces losses as air passes through the venturi. In addition, vertical axis and Savonius-type rotors or wind turbines have been proposed in the prior art. Bonetto, U.S. Pat. No. 4,474,529 (Kinsey), U.S. Pat. Nos.

5,332,354, and 5,852,331 show various vertical axis wind turbines. Further, U.S. Pat. No. 6,538,340 (Elder) contemplates use of a sandwich material for construction of wind turbine systems. Potential for improvement exists in these and other areas that may be apparent to a person of skill in the art having studied this document.

SUMMARY OF PARTICULAR EMBODIMENTS OF THE INVENTION

This invention provides, among other things, methods of improving the power production capability of a new or existing wind farm, wind farms for generating electricity from wind, and various apparatuses for harnessing wind energy. Various embodiments of the invention provide as an object or benefit that they partially or fully address one or more of the needs, potential areas for improvement or benefit, or functions described herein, for instance. Specific embodiments provide as an object or benefit, for instance, that they increase or improve the power production capability of a new or existing wind farm, or of a particular area of available land, or allow greater power production per area of land, more wind turbines per area of land, or less interference between adjacent wind turbines. In some embodiments, an object or benefit may be to install at least some wind turbines at locations within the wind farm where wind speeds are relatively high.

In addition, some embodiments provide as an object or benefit, for example, that they provide a wind turbine in which the propeller turns at a higher speed so that a speed increaser is not required or need not increase the speed as much, proportionally, particularly while addressing other objects or potential areas for benefit. Furthermore, some embodiments provide as an object or benefit, for instance, that they provide a wind turbine having smaller blades or provide a venturi that increases wind velocity and that has a shape that reduces losses as air passes through the venturi. Moreover, some embodiments protect people, livestock, wildlife, birds, or a combination thereof. Further various embodiments utilize different construction methodologies, require different construction facilities, or compliment rather than competing directly with existing horizontal-axis wind turbine designs. In addition, a number of embodiments are competitive with prior art technology on a cost per KWH basis, delivery time basis, or both. Furthermore, certain embodiments facilitate faster manufacturing and implementation of wind energy production capability on a worldwide basis.

In specific embodiments, this invention provides methods of improving the power production capability of a wind farm, which may be either a new or existing wind farm, for example. The wind farm may have at least two primary wind turbines, and may have a prevailing or predominant wind direction. In various embodiments, such a method includes a step of obtaining or providing at least one secondary wind turbine having a substantially smaller size than either of the primary wind turbines. In addition, some embodiments include a step of installing the secondary wind turbine in between, down wind of, and substantially below the primary wind turbines. In some embodiments, the method includes (often in the following order) at least the steps of measuring the wind speed in the wind farm at a plurality of locations and at a plurality of times, identifying a plurality of target locations within the wind farm where the wind speed is substantially greatest (at least during particular time periods) and installing secondary wind turbines at (at least some of) the target locations.

In a number of embodiments, the wind farm includes a row of at least three primary wind turbines, and more than one of the secondary wind turbines are obtained or provided. In addition, in some embodiments, each secondary wind turbine has a substantially smaller size than at least some of the primary wind turbines, and the secondary wind turbines are installed in a row substantially parallel to the row of primary wind turbines. Furthermore, in some embodiments, at least a plurality of the secondary wind turbines are each in between, down wind of, and substantially below two of the primary wind turbines. Further, in many embodiments, the row of primary wind turbines may be substantially perpendicular to the predominant wind direction.

Moreover, in some embodiments, the wind farm includes a plurality of substantially parallel rows of primary wind turbines (e.g., at least three in each row), and the secondary wind turbines are installed in a plurality of rows that are each substantially parallel to the rows of primary wind turbines. In some such embodiments, at least one of the rows of secondary wind turbines are in between two rows of the primary wind turbines, for example. Various embodiments further include a step of obtaining a venturi, and the secondary wind turbine may be installed within the venturi (e.g., at the target location). Further, some embodiments of the invention include steps of obtaining an enclosure that has at least one screen and installing the secondary wind turbine within the enclosure or installing the enclosure around the secondary wind turbine.

In addition, some embodiments further include, before the step of installing secondary wind turbines, a step of evaluating whether installing secondary wind turbines at the target locations would adversely affect the primary wind turbines, a step of determining an appropriate size of the secondary wind turbines, or both. In some of the embodiments, the target locations are in between the primary wind turbines when viewed looking down wind from a predominant wind direction, are down wind from the primary wind turbines with reference to a predominant wind direction, are at a lower elevation than the primary wind turbines, or a combination thereof.

Besides the methods previously mentioned, the invention also provides, in various embodiments, systems such as wind farms for generating electricity from wind. These wind farms include, in many embodiments, a plurality of primary wind turbines, each having a height above a ground surface, and each having a primary electrical generator. Various examples of wind farms also have a plurality of secondary wind turbines, each having its own height above the ground surface, such that the average secondary wind turbine height is substantially less than an average primary wind turbine height, for example. Each secondary wind turbine may include a secondary electrical generator, in some embodiments. These wind farms may also have an enclosure, in various embodiments, at least partially surrounding each secondary wind turbine, and, in many embodiments, an electrical power collection system configured to collect electrical power from the primary electrical generators and from the secondary electrical generators and to deliver the electrical power to an electrical power distribution grid.

In some embodiments, each enclosure includes a venturi that has a particular height above the ground surface, and each venturi may have a concentrator section extending from an entrance opening to a throat, such that the entrance opening has a substantially greater cross-sectional area than the throat, for example. In some embodiments, each secondary wind turbine is located at the throat of one of the venturis, at least one screen is provided (e.g., covering the entrance opening), at least part of the concentrator section has the shape of at least a fifth-degree polynomial curve, or a combination thereof. Further, in many embodiments, a plurality of the venturis include a diffuser section extending from the throat to an exit opening, such that the exit opening has a greater cross-sectional area than the throat.

In a number of embodiments, the primary wind turbines and the secondary wind turbines are alternately arranged in the wind farm. Further, in particular embodiments, the primary wind turbines are arranged in at least one primary wind turbine row, the secondary wind turbines are arranged in at least one secondary wind turbine row, and the (at least one) secondary wind turbine row is substantially parallel to the (at least one) primary wind turbine row. In fact, in some embodiments, the secondary wind turbine rows and the primary wind turbine rows are substantially parallel and alternately arranged, the primary wind turbine rows and the secondary wind turbine rows are each substantially perpendicular to a prevailing wind direction, or both. And in many embodiments, the primary wind turbines are venturiless and each may include a multi-blade propeller mounted on a tower and may have variable-pitch blades, for example.

In addition to methods and wind farms, the invention also provides various apparatuses for harnessing wind energy. In particular embodiments, the apparatus includes a venturi that has a concentrator section extending from an entrance opening to a throat (e.g., the entrance opening having a substantially greater cross-sectional area than the throat), a diffuser section extending from the throat to an exit opening (e.g., the exit opening having a greater cross-sectional area than the throat), a turbine located at the throat of the venturi, or a combination thereof, for example.

In some embodiments, the venturi has an interior surface that includes a sandwich material that has (at least) a first skin, a core, and a second skin, such that the core is thicker than either the first skin or the second skin. In this particular embodiment, the core is substantially less dense than either the first skin or the second skin and the core is located between and is adhered to the first skin and the second skin. In some embodiments, the first skin forms at least a majority of the interior surface of the venturi (or substantially all of the interior surface of the venturi in certain embodiments). In various embodiments, the first skin is predominantly metallic, the second skin is predominantly metallic, the core consists essentially of a polymer or a metallic honeycomb structure, the first skin and the second skin are adhered to the core with an adhesive, or a combination thereof.

Further, some embodiments of an apparatus for harnessing wind energy include a concentrator section that has the shape of at least a fifth-degree polynomial curve over at least part of its length. In fact, in particular embodiments, the concentrator section has the shape of (at least) a fifth-degree polynomial curve revolved around an axis of symmetry. In various embodiments, the wind forms a flow stream through the venturi, and the concentrator section is shaped to be substantially tangent to the flow stream (at least) at the entrance opening and at the throat.

Still further, some embodiments of an apparatus for harnessing wind energy include a venturi and a Savonius rotor located at the throat of the venturi. In certain embodiments, an electrical generator may be rotatably connected to the Savonius rotor with a vertical axis of rotation, and the generator may be located below the rotor in some embodiments.

In yet another embodiment, the invention also provides an apparatus for harnessing both wind and solar energy. This embodiment includes a venturi with a concentrator section, a turbine located at the throat, an electrical generator rotatably connected to the turbine, and a solar collection system utilizing the venturi for harnessing solar energy. In different embodiments, the venturi is used to reflect sunlight onto a solar collector, to support a plurality of photovoltaic cells, or both, as examples. Various embodiments further include an electrical power collection system configured to collect electrical power from the electrical generator and from the solar collection system and deliver the electrical power to an electrical power distribution grid.

The invention also provides various wind farms that each have a plurality of apparatuses, such as those identified above. In some embodiments, each apparatus may include a first electrical generator rotatably connected to the turbine. Some such wind farms further include a plurality of venturiless primary wind turbines, each having a primary wind turbine height above a ground surface, and each having a second electrical generator. Various embodiments also include an electrical power collection system configured to collect electrical power from the first electrical generators and the second electrical generators and deliver the electrical power to an electrical power distribution grid. And in some of these embodiments, at least a plurality of the venturis are located in between, down wind of, and substantially below two of the primary wind turbines.

Other embodiments of the invention include various combinations of the features and limitations described herein, and different embodiments have a variety of objects and provide different benefits, some of which may be apparent to a person of skill in the art.

The drawings illustrate, among other things, various particular examples of embodiments of the invention, and certain characteristics thereof. Different embodiments of the invention include various combinations of elements shown in the drawings, described herein, known in the art, or a combination thereof.

DETAILED DESCRIPTION OF EXAMPLES OF EMBODIMENTS

In a number of embodiments, this invention provides improvements to wind farms for generating electricity from wind, and various apparatuses for harnessing wind energy, as well as methods related thereto. As an example, this invention provides, among other things, methods of improving the power production capability of a new or existing wind farms. A number of embodiments include secondary wind turbines provided at particular locations within a wind farm. In some embodiments, venturis surround wind turbines to concentrate the wind or accelerate wind speed, and these venturis may have a particular shape, may be made of particular materials arranged in particular ways, or both. In different embodiments, wind turbines may be axial-flow horizontal-axis turbines, or may be Savonius turbines, for instance. And in some embodiments, wind turbines may be combined with other power production means, in various embodiments, such as solar power or other renewable energy resources, for example.

Figure 1:
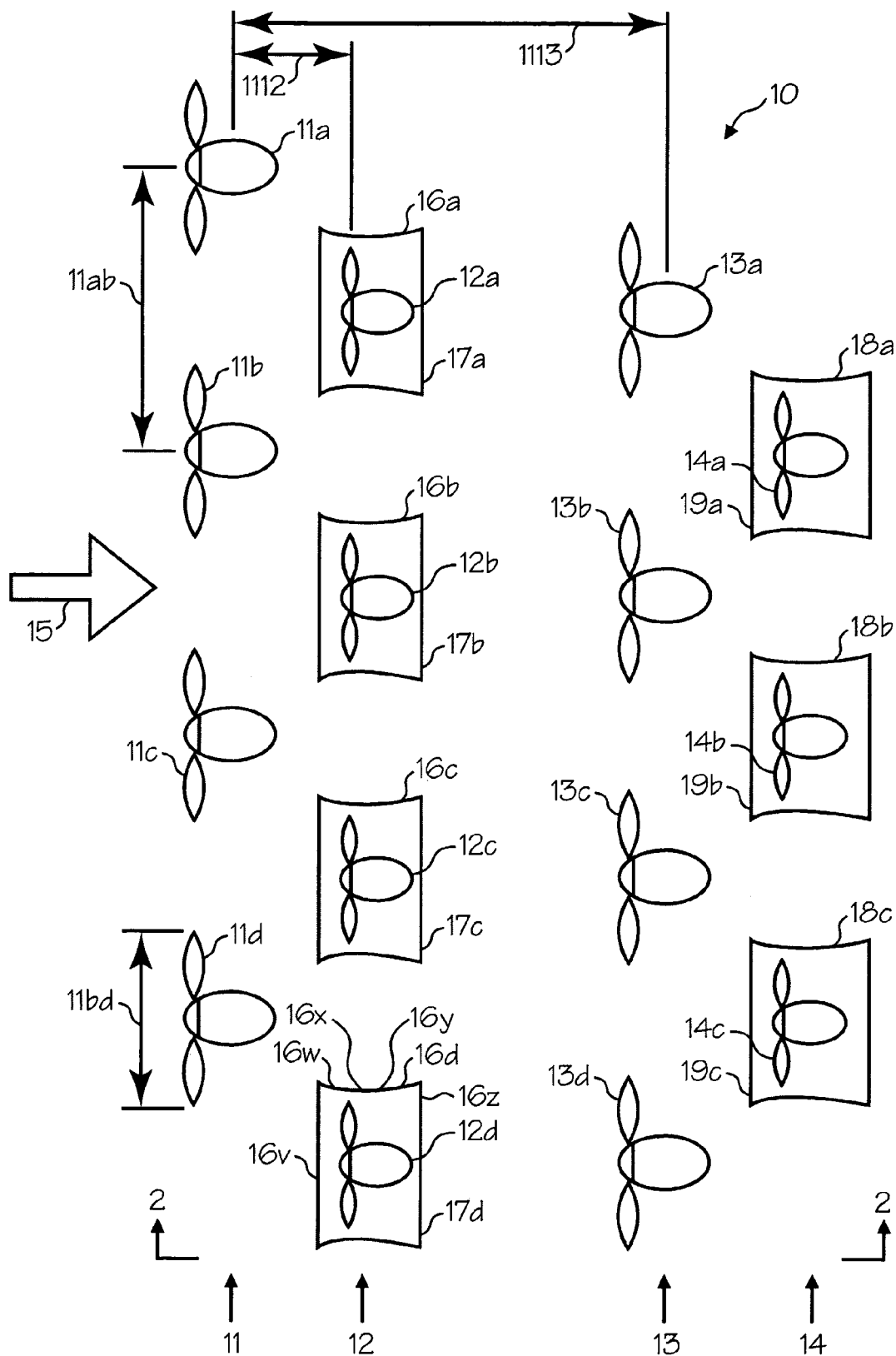
FIG. 1 is a top or plan view illustrating an example of a wind farm in accordance with an embodiment of the invention.
Figure 2:
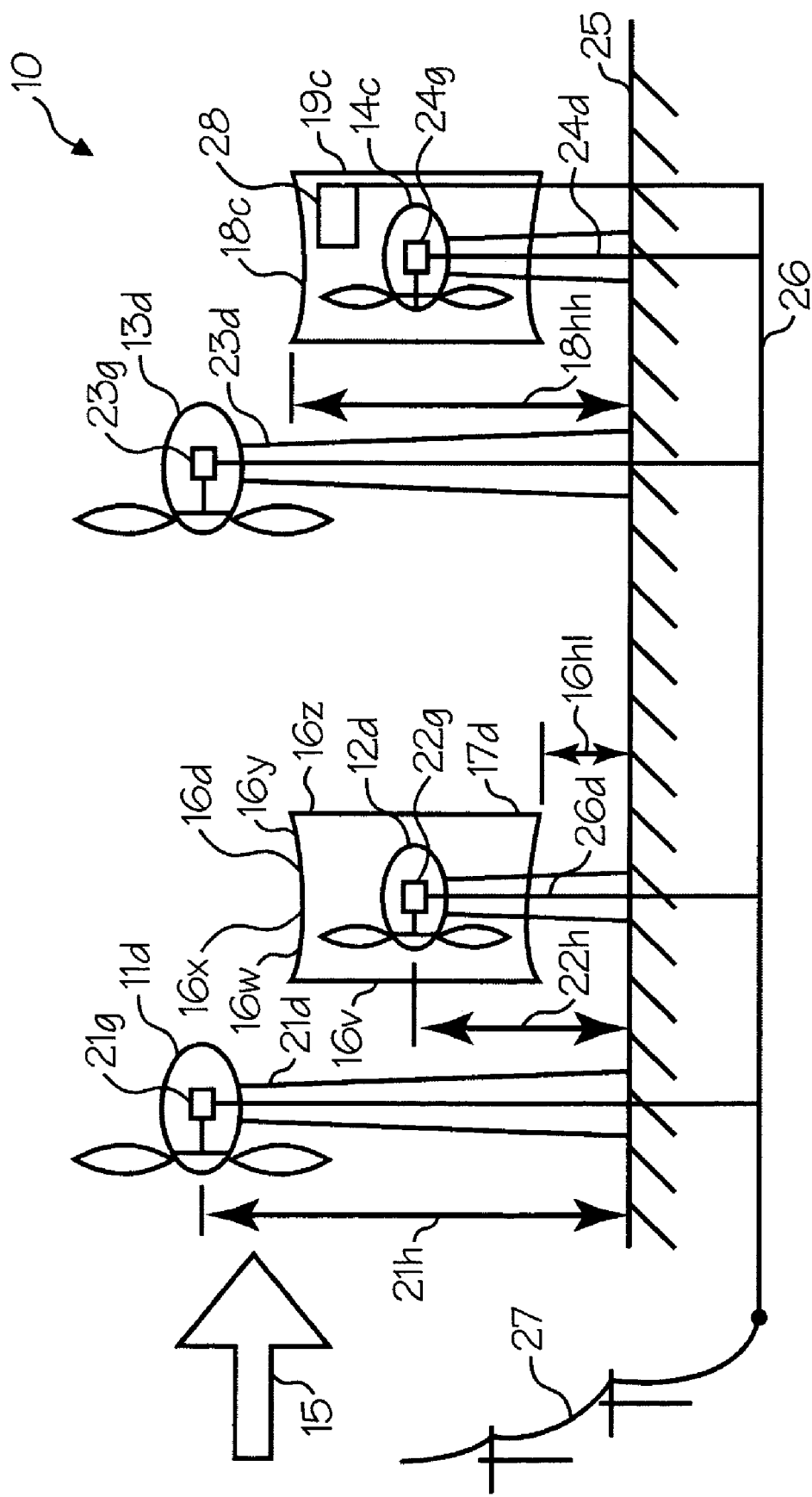
FIG. 2 is a side view of the wind farm of FIG. 1, providing additional detail in some respects.

Referring now to FIG. 1, a common type of wind turbine used commercially is the horizontal axis wind turbine (HAWT), which typically have three blades, which may be variable-pitch blades. In a wind field or wind farm installation, these wind turbines are usually placed at substantially equidistant intervals to maximize wind power generation. FIG. 1 is a top or plan view that illustrates an example of a wind farm, wind farm 10, having primary wind turbines 11a to 11d and 13a to 13d, in rows 11 and 13, which in this embodiment are spaced apart at substantially equidistant intervals 11ab (between primary wind turbines 11a and 11b in row 11) and 1113 (between rows 11 and 13) as shown. It should be noted that FIGS. 1 and 2 are not drawn to scale, for example, with respect to sizes of the components relative to their spacing. In addition, wind turbine blades will usually be larger relative to the hub size than what is shown.

Primary wind turbines 11a to 11d and 13a to 13d may be HAWT's, for example. The turbines (e.g., primary wind turbines 11a to 11d and 13a to 13d) themselves are typically supported on towers a significant distance off the ground because of safety concerns for people and wildlife on or near the ground, and in order to minimize ground effects on wind flow. For example, FIG. 2 illustrates a side view of wind farm 10 (shown in plan view in FIG. 1), which shows towers 21d and 23d supporting wind turbines 11d and 13d respectively, as examples. In the embodiment illustrated, all of the primary wind turbines 11a to 11d and 13a to 13d have substantially the same hub height 21h above ground surface 25, and towers 21d and 23d are substantially the same size. In different embodiments, tower size may vary somewhat, for example, to compensate for ground 25 topography, or tower size may be consistent independent of ground 25 topography.

Wind farm 10 has eight primary wind turbines 11a to 11d and 13a to 13d arranged in two rows 11 and 13. Other wind farms may have as few as two primary wind turbines or any number up to many more than the eight shown, which may be arranged in one row (e.g., 11) or a larger number of rows (e.g., two or more). In the embodiment shown, rows 11 and 13 are substantially perpendicular or perpendicular to a prevailing or predominant wind direction 15 and are substantially parallel or parallel to each other. (As used herein, substantially perpendicular and substantially parallel means to within 20 degrees. Further, as used herein, to be substantially parallel, rows must not intersect along their lengths. Perpendicular and parallel mean to within one degree.) In some embodiments, rows of wind turbines may be arranged at another angle to the predominant wind direction 15 (e.g., at 10, 15, 20, 30, 45, 60, or 90 degrees from perpendicular to wind direction 15, as examples.

In a wind farm having only substantially equally sized and spaced HAWT's (e.g., farm 10 with only primary wind turbines 11a to 11d and 13a to 13d), for a given size tract of land 25, a significant portion of the available energy is not extracted because of the spacing (e.g., 11ab, 1113, or both) and the height (e.g., 21h) of the wind turbines (primary wind turbines 11a to 11d and 13a to 13d). A second row of wind turbines (e.g., row 13) can be located behind the first row 11 (as shown), but usually at a minimum distance 1113 of 7 turbine diameters to allow the wind to speed up to approach free stream velocity. Since commercial turbine diameters are in the order of 50 to 100 m, the second row 13 of primary wind turbines needs to be positioned a significant distance behind the first row 11 and in many cases is not feasible due to lack of availability of land (e.g., ground 25).

In some embodiments, one or more secondary wind turbines (e.g., 12a to 12d and 14a to 14c shown in FIG. 1) may be added to an existing wind farm (e.g., 10) having primary wind turbines (e.g., 11a to 11d and 13a to 13d) or incorporated into a new wind farm (e.g., 10) design. In some embodiments one or more secondary wind turbines (e.g., 12a to 12d and 14a to 14c) may be installed in between, down wind of, and substantially below the primary wind turbines (e.g., 11a to 11d and 13a to 13d). This may be the location for some or all of the secondary wind turbines, in different embodiments. In the example of wind farm 10, each of secondary wind turbines 12a to 12c and 14a to 14c are each installed in between, down wind of, and substantially below two of the primary wind turbines 11a to 11d and 13a to 13d (e.g., when viewed from the direction of prevailing wind direction 15).

Referring to FIG. 2, in a number of embodiments, the average secondary wind turbine height 22h is less than or substantially less than an average primary wind turbine height 21h. As used herein, secondary wind turbine height 22h being substantially less than primary wind turbine height 21h means that secondary wind turbine height 22h is less than 75 percent of primary wind turbine height 21h. The benefit and details of this arrangement of wind farm 10 will be explained in more detail below.

In a number of embodiments, the wind farm 10 includes a row 11 of at least three primary wind turbines (e.g., at least 11a to 11c), and at least a plurality of the secondary wind turbines (e.g., at least 12a and 12b) are obtained or provided. In addition, in a number of embodiments, the primary wind turbines (e.g., 11a to 11d and 13a to 13d) and the secondary wind turbines (e.g., 12a to 12d and 14a to 14c) are alternately arranged in wind farm 10. In the embodiment illustrated, primary wind turbines and secondary wind turbines are alternately arranged in the direction of predominant wind 15, for example, or in directions about 45 degrees therefrom. As used herein, alternately arranged means there is one primary turbine or row, followed by one secondary turbine or row, followed by one primary turbine or row, followed by one secondary turbine or row. In some embodiments, this sequence may continue. In a quantity of embodiments, the secondary wind turbine rows (e.g., 12 and 14) and the primary wind turbine rows (e.g., 11 and 13) are substantially parallel and alternately arranged, are each substantially perpendicular to a prevailing wind direction 15, or both (e.g., as shown).

In some embodiments, the secondary wind turbines (e.g., at least 12a and 12b) are installed in row 12, which is substantially parallel to row 11 of primary wind turbines (e.g., at least 11a to 11c) in the embodiment illustrated. Furthermore, in some embodiments, at least a plurality of the secondary wind turbines (e.g., 12a and 12b) are each in between, down wind of, and substantially below two of the primary wind turbines (e.g., two of 11a to 11c). Moreover, in the embodiment shown, the wind farm 10 has a plurality of substantially parallel rows (11 and 13) of primary wind turbines (11a to 11d and 13a to 13d) with at least three in each row. And the secondary wind turbines 12a to 12d and 14a to 14c are installed in a plurality of rows (i.e., rows 12 and 14) that are each substantially parallel to the rows 11 and 13 of primary wind turbines. In this embodiment, rows 12 of secondary wind turbines 12a to 12d is in between two rows 11 and 13 of primary wind turbines 11a to 11d and 13a to 13d, for example.

A computational fluid dynamics (CFD) simulation of a wind farm similar to wind farm 10 with only primary wind turbines 11a to 11d and 13a to 13d, revealed a wake behind the wind turbines 11a to 11d where the predominant wind 15 slows down to less than the free stream velocity in the wind farm. This is because part of the wind energy is extracted by the wind turbines 11a to 11d and converted to useful mechanical and electrical power, for instance. Any wind turbine placed in the wake would have less available wind energy than anywhere else in the wind farm. However, at a certain distance behind and between the wind turbines 11a to 11d, and at an elevation (e.g., hub height 22h) below the hub height 21h of the primary wind turbines 11a to 11d, it was noticed that the wind actually speeds up beyond the free stream velocity of the wind farm. This location may be referred to herein as a wind speed-up region or target location. In FIGS. 1 and 2, secondary wind turbines 12a to 12d are shown at these examples of potentially desirable target locations or wind speed-up regions relative to primary wind turbines 11a to 11d. Similarly, secondary wind turbines 14a to 14c are shown at potentially desirable locations or wind speed-up regions relative to primary wind turbines 13a to 13d.

Secondary wind turbines 12a to 12d and 14a to 14c may be smaller in size or even substantially smaller in size than some or all of primary wind turbines 11a to 11d and 13a to 13d. As used herein, secondary wind turbines 12a to 12d and 14a to 14c being smaller in size than primary wind turbines 11a to 11d and 13a to 13d means that the secondary wind turbines have a venturi entrance area (e.g., area of entrance 16v perpendicular to the direction of flow) that is less than the area of the blade diameter (e.g., 11bd) of the venturiless primary turbines. Further, as used herein, substantially smaller, in this context, means having a venturi entrance area (e.g., area of entrance 16v perpendicular to the direction of flow) that is less than half of the area of the primary turbine blade diameter (e.g., 11bd). In embodiments of secondary wind turbines that do not have a venturi, the area represented by the diameter of the secondary wind turbine blades would be used instead of a venturi entrance area.

FIG. 2 also illustrates that primary wind turbines 11d and 13d have generators 21g and 23g and secondary wind turbines 12d and 14c have generators 22g and 24g in many embodiments. In a number of embodiments, each wind turbine (primary and secondary) has an electrical generator. Each generator may be rotatably connected to the corresponding turbine, either directly or through a gear box or speed increaser. In some embodiments generators for primary and secondary wind turbines may be of a different size, turn at different speeds, have different gear box requirements, or a combination thereof. FIG. 2 also illustrates that, in many embodiments, wind farm 10 includes an electrical power collection system 26 configured to collect electrical power from the primary electrical generators 21g and 23g, for example, and from the secondary electrical generators 22g and 24g, for example, and to deliver the electrical power to an electrical power distribution grid 27.

Various embodiments of the invention may increase the amount of wind energy that can be extracted in a new or an existing wind farm using complementary devices, and may do so in a safe manner in many embodiments. In some situations, an HAWT cannot operate safely in the wind speed-up region identified in the CFD analysis mentioned earlier. However if the turbine is enclosed in a shroud, venturi, enclosure, or similar device, it may improve safety dramatically by preventing or reducing human, bird, or animal contact with the rotating wind turbine. Furthermore by shaping the shroud in the form of a venturi, certain embodiments speed up the wind even more, resulting in a further augmentation of power, reduction in turbine size, or both.

In some instances, a conventional free standing wind turbine (e.g., similar to primary wind turbines 11a to 11d and 13a to 13d) cannot be placed at the wind speed up or target location because of safety concerns. The rotating wind turbine may be only a small distance off the ground 25 and could pose a hazard to humans, birds, or animals, for example. But in other embodiments, safety of humans, birds, or animals, may not be a significant concern, or risks to humans, birds, or animals may be less significant. In such embodiments, secondary wind turbines may be utilized that do not have shrouds, enclosures, or venturis (e.g., venturiless wind turbines).

Referring still to FIGS. 1 and 2, each of the secondary turbines 12a to 12d and 14a to 14c are enclosed within, installed within, or at-least partially surrounded by an enclosure 17a to 17b or 19a to 19c. In the embodiment illustrated, enclosures 17a to 17b and 19a to 19c include venturis 16a to 16d or 18a to 18c. In various embodiments, each enclosure 17a to 17b or 19a to 19c or each venturi 16a to 16d or 18a to 18c, has a particular height (e.g., 16hl or 18hh where 16hl is the height of the lowest point of venturi 16d and 18hh is the height of the highest point of venturi 18c) above the ground surface 25, for example. Referring to secondary wind turbine 12d in FIGS. 1 and 2 as an example, each secondary venturi (e.g., 16a to 16d and 18a to 18c) has, in this embodiment, an opening or entrance 16v, a concentrator section 16w extending from entrance 16v to a throat 16x, a diffuser section 16y, and an opening or exit 16z. In this embodiment, diffuser 16y extends from throat 16x to exit 16z. In some embodiments, enclosures 17a to 17d and 19a to 19c may include grills, gratings, or screens (all of which are included herein in the scope of the word "screen") at or over entrance 16v, exit 16z, or both. Screens may have openings sized to prevent entrance of the people, animals, or birds that are to be protected. Examples of screens include hardware cloth, chicken wire, chain link, bars, perforated plate, window screen, netting, etc.

In various embodiments, entrance 16v, exit 16z, or both, may have a greater or substantially greater cross sectional area than throat 16x. As used herein, a substantially greater area means more than 20 percent greater area. In some embodiments, entrance 16v may have a greater cross sectional area than exit 16z. And in some embodiments, each secondary wind turbine (e.g., 12a to 12d and 14a to 14c) is located at the throat 16x of one of the venturis (e.g., 16a to 16d and 18a to 18c).

The wind speed up (e.g., between primary wind turbines 11a to 11d), for example, is based on the physical principle of mass conservation that can be expressed in form of the continuity equation for incompressible, low speed flow in a stream tube:

$$d_1 u_1 A_1 = d_2 u_2 A_2$$

where d=density of air, u=flow velocity, and A=cross-sectional area. As the flow can be considered incompressible at such low variations in pressure, the density variations can be neglected. Thus:

$$u_1 A_1 = u_2 A_2$$

which states that the flow will speed up if the area decreases and vice versa.

As mentioned, the wake behind the primary wind turbines 11a to 11d contains slowed-down flow, and the flow outside the wake may be accelerated (e.g., absent secondary wind turbines 12a to 12d). These are examples of a control-volume for which the stream-tube approach is valid. The product uA must remain constant through out each cross-section of the domain. Thus the flow outside the wake may tend to speed up to provide continuity. Various embodiments of the current invention take advantage of this speed-up.

Referring still to FIGS. 1 and 2, a particular example of the invention will now be described. Based on CFD-simulation results, in this example, secondary turbines (e.g., 16a to 16c) are each placed at the centerline between (i.e., half way between) two 50-meter high (i.e., height 21h) primary wind turbines 11a to 11d that are located 94 meters apart (spacing 11ab) and have 47 meter diameter blades (e.g., diameter 11bd). It was discovered that a venturi (e.g., 16a to 16c) with a 26meter inlet or entrance 16v diameter can be constructed 40 meters behind (i.e., spacing 1112 down wind with reference to the predominant wind 15 direction) the existing row 11 of primary wind turbines 11a to 11d with its lowest point located 2 meters (height 16hl) above the ground 25.

Such a venturi (16a to 16c) fits substantially or completely under the wake of the existing primary wind turbines 11a to 11d in this embodiment and thus, does not interfere with the existing primary turbines 11a to 11d or 13a to 13c, for example. On the end of row 12, extending past the end of row 11 shown, secondary wind turbine 12d may experience somewhat different flow conditions than the other secondary turbines 12a to 12c, but may also be located in a desirable or target location in at least some wind farms.

In the example just described, flow continuity, as discussed, indicated that the velocity at the locations of secondary turbines 12a to 12c is increased (absent slowing effects of secondary turbines 12a to 12c and enclosures 17a to 17c), and CFD-simulations confirm that a speed increase over the free-stream speed is achieved. In addition, the venturis 16a to 16c speed up the airflow at the throat section 16x based on the area ratio of inlet or entrance 16v to throat 16x as discussed above accounting for entrance, exit, contraction and diffuser losses. Flow velocity and pressure are related to each other by Bernoulli's equation:

$$P + (\tfrac{1}{2}) dV^2 = \text{Constant}$$

where P=Pressure, d=Density of air, and V=Velocity. In other words, the pressure will increase when velocity decreases and vice versa. The air pressure at the venturi throat 16x is lower than that at the venturi inlet 16v or that of the surrounding air. Thus the flow should be diffused in many embodiments prior to discharge to surrounding air in order to avoid flow reversal at the exit 16z of the venturi. Furthermore, in many situations, the relationship between the velocity and the pressure limits the achievable speed increase to 50% which corresponds to a contraction ratio of 1.5 from the inlet 16v to the throat 16x in some embodiments. This leads to a throat diameter of 21 meters in the above example.

FIGS. 1 and 2 illustrate an embodiment of a shape of a venturi (e.g., venturi 16d shown in both figures). In this embodiment, venturi 16d may be round when viewed in the direction of predominant wind 15, for example. In this embodiment, concentrator 16w and diffuser 16y are both curved (e.g., as viewed in FIGS. 1 and 2), and may be elliptical or have the shape of an arc, for example. In this embodiment, concentrator 16w has a smaller radius of curvature than diffuser 16y, in these views. In other embodiments, diffuser 16y may have straight sides rather than curved.

Figure 3:
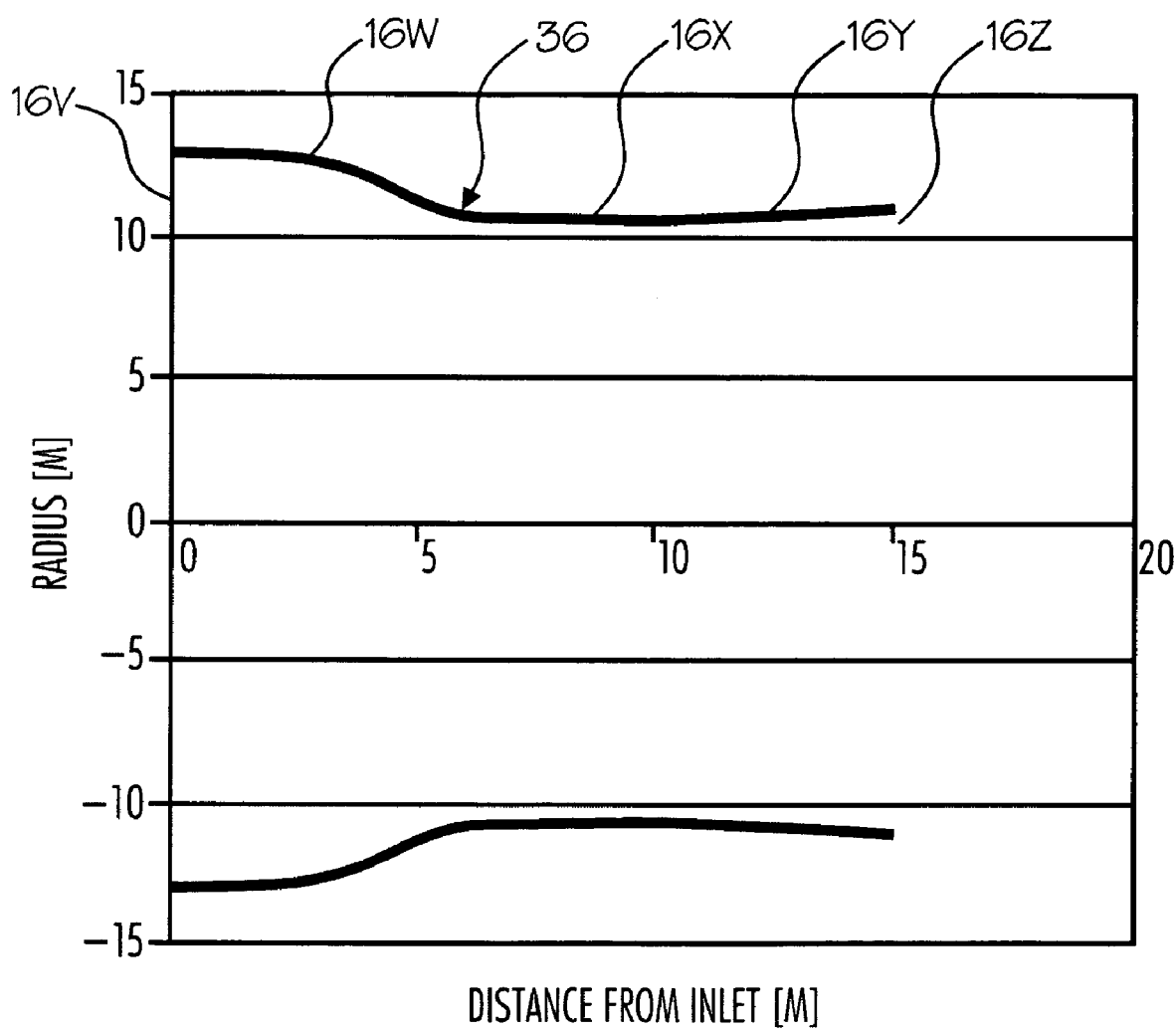
FIG. 3 is a graph illustrating an example of a shape of the inside of a venturi in accordance with an embodiment of the invention.

FIG. 3 illustrates another example of a shape of concentrator 16w and diffuser 16y sections of an embodiment of a venturi 36. Concentrator 16w, in this embodiment, has a shape of a fifth-degree polynomial curve to minimize entrance, exit and contraction losses and to prevent flow separation. The embodiment shown uses a fifth-degree polynomial curve over the entire length of concentrator 16w (e.g., from entrance 16v to throat 16x) but other embodiments may use a fifth-degree polynomial curve over just part of that length or through some or all of diffuser 16y. The turbine placed at the throat 16x of the venturi (e.g., 36) extracts energy from the flow and reduces the velocity by 33% in some embodiments, for example. Thus, only a short diffuser section 16y is required in this embodiment behind the turbine (e.g., 12d) prior to discharge to surrounding flow at exit 16z. The angle of the diffuser section 16y is limited to less than 10 degrees in many embodiments to prevent separation. This example uses a 5 degree angle because the velocity profile at the throat in this embodiment may be non-uniform and thus more susceptible to separation.

Figure 4:
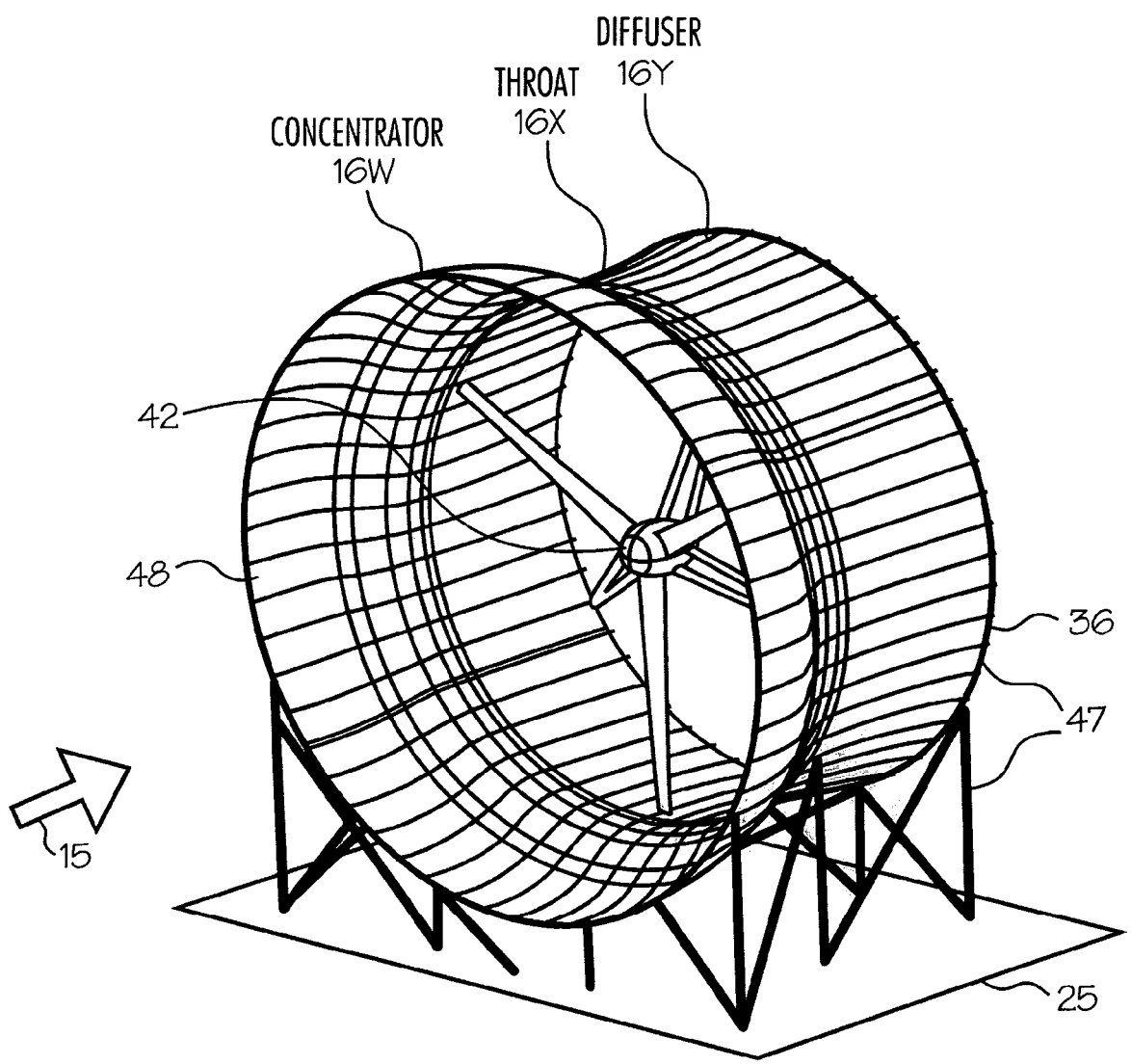
FIG. 4 is a an isometric view of an example of a horizontal-axis wind turbine within a venturi of the shape illustrated in FIG. 3.

FIG. 4 illustrates an example of an embodiment of a wind turbine 42 within a venturi 36. In this embodiment, venturi 36, including concentrator 16w, throat 16x, and diffuser section 16y is used with a 3-bladed wind turbine 42 placed at the throat section 16x. Venturi 36 may be used in place of some or all of venturis 16a to 16d and 18a to 18c shown in FIG. 1, and turbine 42 may be used in place of some or all of secondary turbines 12a to 12d and 14a to 14c. Turbine 42 is a horizontal-axis wind turbine and may have a generator, and in some embodiments, variable-pitch blades, a speed increaser, or both.

As mentioned, in some embodiments, the concentrator 16w may be designed with the shape of a fifth-degree polynomial curve (or higher) to minimize entrance, exit and contraction losses, for instance. FIGS. 3 and 4 illustrate such an embodiment. Surface 48 of concentrator section 16w, in this embodiment, has the shape of a surface of revolution that can be obtained by revolving a high-degree polynomial fitted curve around an axis of symmetry. The higher order polynomial, in a particular example, is of the form:

$$E = X/L$$

$$h = [-10 E^3 + 15 E^4 - 6 E^5](H_i - H_o) + H_i$$

where $H_i$ and $H_o$ are the radius at the entrance 16v and throat 16x respectively. Such a curve may be constructed in such a way that upstream and downstream ends of the curve are tangent, substantially tangent (e.g., to within 5 degrees), or parallel to the flow stream (e.g., at entrance 16v and throat 16x). This may minimize the possibility of flow separation at the entrance 16v and the throat 16x, for example, and provides for reduction of mean-flow non-uniformities and the relative turbulence level in some embodiments. Furthermore, providing a tangency to the flow direction at the entrance 16v may minimize losses. In addition, providing tangency to the flow of the curve profile at the throat 16x may increase the probability of obtaining uniform flow at the turbine 42 inlet. Furthermore, the mid-portion slope of the curve may be chosen to minimize flow losses by controlling pressure gradient and in a manner that allows smooth merging with the throat 16x.

The venturi, in many embodiments, (e.g., 36, 16a to 16d, or 18a to 18c) can be constructed using a variety of manufacturing methods and materials. An example is the steel tubular frame structure 47 shown in FIG. 4. Suitable cover materials that may be used to form surface 48 include galvanized steel, aluminum, a stretched fabric cover such as sail fabric, and various composite or sandwich panels, as examples.

Figure 5:
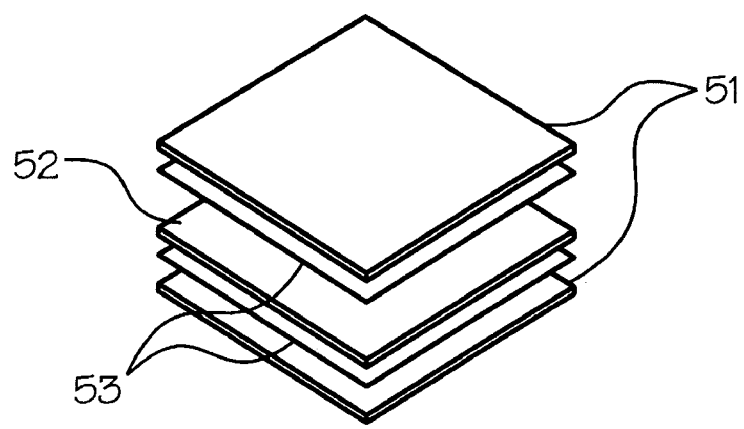
FIG. 5 is an isometric view of a piece of a sandwich material that may be used to construct a venturi in accordance with particular embodiments of the invention.

Referring now to FIG. 5, sandwich panels 50 provide similar strength as steel or aluminum but can be lower in cost, weight, or both, thus lowering the installation, maintenance and transportation costs of a venturi such as venturi 16a or 36, for example. In some embodiments, the venturi (e.g., 16a to 16d, 18a to 18c, 36, or others) has an interior surface (e.g., 48) that includes a sandwich material (e.g., 50) that has (at least) a first skin (e.g., the top layer 51), a core (e.g., 52), and a second skin (e.g., the bottom layer 51), such that the core (e.g., 52) is thicker than either the first skin or the second skin (e.g., either layer of skin 51), the core (e.g., 52) may be substantially less dense (i.e., less than half of the density) than either the first skin or the second skin (e.g., either layer of skin 51), and the core (e.g., 52) is located between and may be adhered to the first skin and the second skin (e.g., the two layers of skin 51) in this embodiment.

In some embodiments, the first skin (e.g., the top layer 51) forms at least a majority (i.e., more than half) of the interior surface 48 of the venturi (e.g., 16a to 16d, 18a to 18c, 36, or others). While in certain embodiments, the first skin (e.g., the top layer 51) forms substantially all (i.e., more than 90%, as used herein) of the interior surface 48 of the venturi (e.g., 16a to 16d, 18a to 18c, 36, or others). In various embodiments, the first skin (e.g., the top layer 51) is predominantly metallic, the second skin (e.g., the bottom layer 51) is predominantly metallic, the core (e.g., 52) consists essentially of a polymer or a metallic honeycomb structure, and the first skin, the second skin (e.g., 51) are adhered to the core (e.g., 52) with an adhesive (e.g., 53), or a combination thereof.

An example of a galvanized steel cover material forming surface 48 (e.g., shown in FIG. 4) is 1.4 mm thick, whereas an example of a sandwich panel 50 construction requires only 0.3 mm thick aluminum skins 51. The total thickness required depends on the core 52 material used. Cost reduction can be achieved by using a low-cost core material 52 such as foam for the core 52 or alternatively creating a low density honeycomb core 52 using aluminum. Balsawood is another alternative material for core 52. Overall weight reduction can be up to 90% in some embodiments, which makes the handling of the panel much easier and even reduce the transportation costs. Composite sandwich panels 50 have been used successfully in construction such as airports and have been shown to withstand weather conditions such as those expected at the venturi (e.g., 16a to 16d, 18a to 18c, or 36) location. The venturi support structure could be constructed using a tubular space frame (e.g., structure 47) or concrete structure, as examples.

In various alternate embodiments, a venturi, shroud, or enclosure may be made of aluminum, plastic, steel, reinforced fabric, concrete, or reinforced concrete, as examples, may be painted or coated, and may be designed to withstand high winds, lightning, rain, snow, freezing, sunlight, earthquakes, and the like. In some embodiments, the venturi may be built into the structure of a building, such as an office building, a hotel, a factory, an apartment building, a shopping mall, a stadium, or the like. Further, in certain embodiments, the venturi may be built into another structure such as a bridge pier, wall, communications tower, dam, or the like. In such embodiments, the venturi may be constructed using materials and methods that are used for such buildings or structures.

Figure 6:
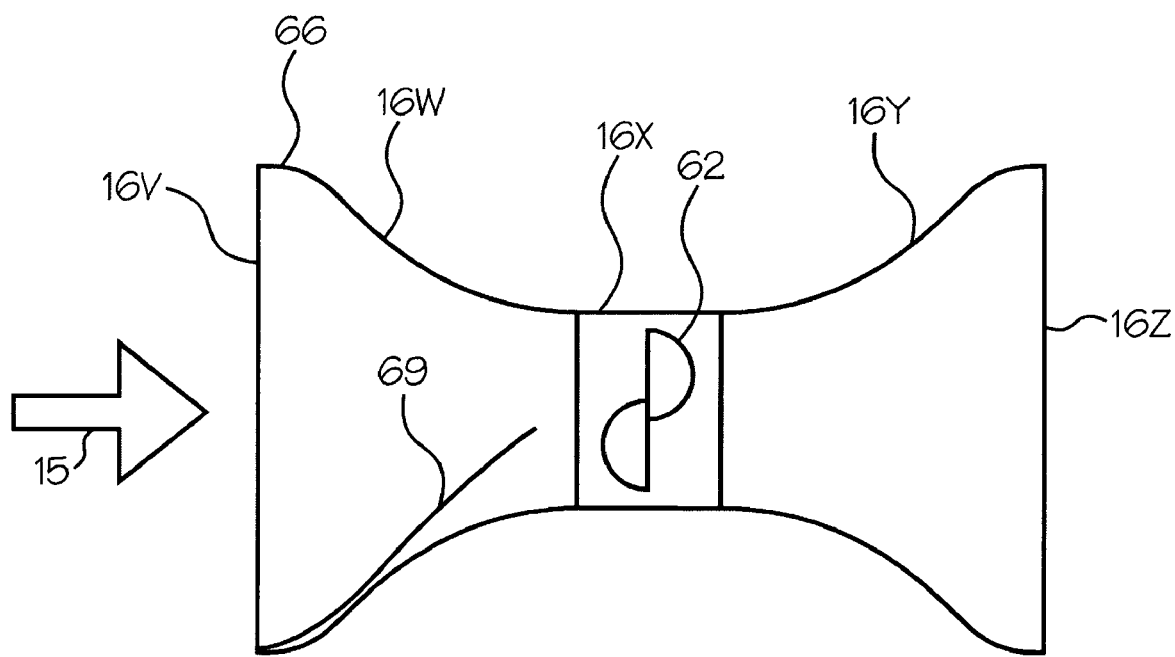
FIG. 6 is a top view of another embodiment of a venturi in accordance with the invention having a Savonius rotor within the venturi.

Wind turbines 12a to 12d and 42 are examples of wind turbines that may be used with venturi 36. Other examples of wind turbines that may be used with venturi 36, 16a to 16b, or another venturi, include two-bladed propellers, four, five, or more bladed propellers, and various vertical axis wind turbines (VAWT) including rotors such as Darrieus turbine, Savonius rotor, etc. FIG. 6 illustrates another embodiment of a venturi, venturi 66, that has a Savonius rotor 62 within throat 16x. Additionally, the inlet section or concentrator 16w of certain embodiments of venturis may be designed to direct flow to only one side of the wind turbine, in the case of a VAWT, passively using the venturi shape or actively with the use of gates or baffles, such a baffle 69 shown in FIG. 6.

Figure 7:
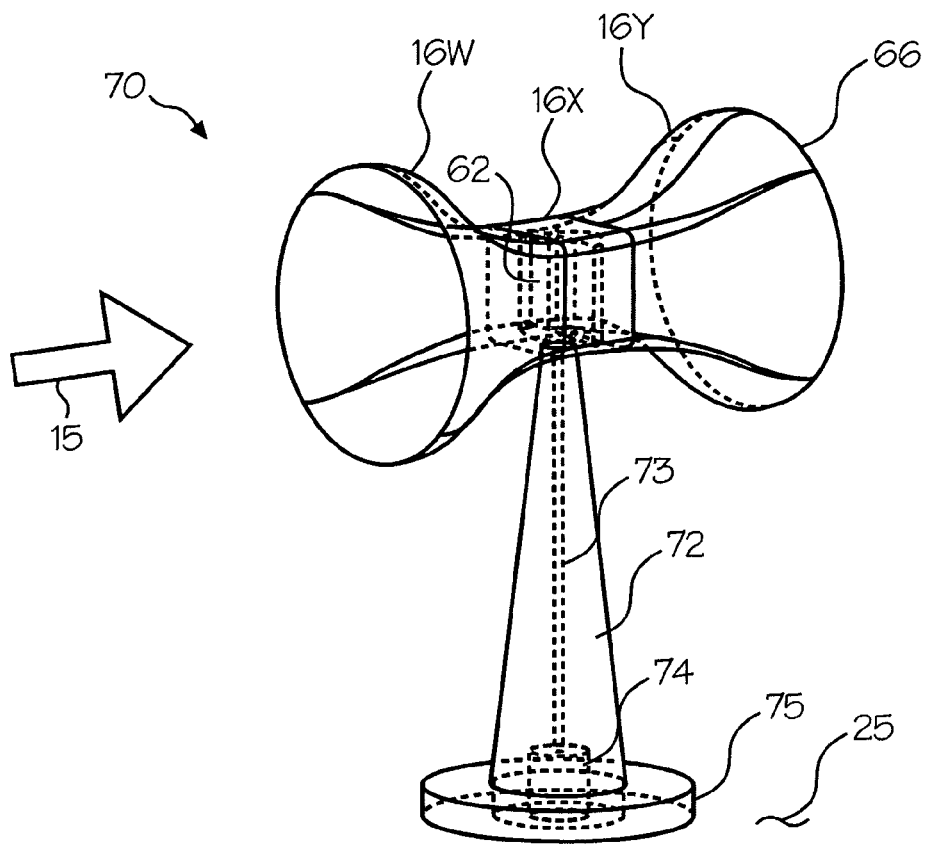
FIG. 7 is an isometric view of the venturi and Savonius rotor of FIG. 6 mounted on a tower with a generator below the rotor.

FIG. 7 illustrates an embodiment of the invention, wind generator 70, wherein Savonius rotor 62 is mounted with a vertical axis within venturi 66 (e.g., at throat 16x). Venturi 66 in this embodiment is supported above ground 25 by tower 72. Rotor 62 is rotatably attached to and turns generator 74 through vertical shaft 73 in this embodiment. Generator 74 is located below rotor 62, on or near the ground 25 in this embodiment, facilitating access for maintenance and avoiding a need to support the weight of generator 74 high above the ground 25. In some embodiments, utilizing a vertical axis wind turbine (VAWT) like the Savonius turbine, instead of the commonly used horizontal axis wind turbines, facilitates placing the generator on the ground 25. But a generator may be located on or near the ground with a HAWT, for example, using a right-angle drive gear box, belt, or chain drive, for instance.

A two-blade Savonius rotor may be S-shaped (e.g., as shown in FIG. 6). Savonius rotors may have two, three, or more blades in different embodiments. In some embodiments, Savonius rotors may have an internal passageway from each blade to the other blade(s). Air traveling from one blade to another may produce an additional force on the second blade that generates additional torque and power. The maximum tip speed ratio of a Savonius rotor in many embodiments may not exceed 1 by much. This results in a slow turning turbine; however, yielding a high torque in many embodiments. The structure of a Savonius turbine may be safer and more durable against storms, in certain embodiments, and since the turbine of many embodiments of this invention is encased in a venturi, failure of the blade while in operation may not be as threatening to the safety of people nearby as for prior art windmills or wind turbines.

Further, because of the high starting torque of a Savonius style rotor, it may be possible to use a gearless or direct drive generator 74 in some embodiments, and avoid expense and transmission losses of a gear train. In an alternate embodiment, a continuously variable transmission (CVT) may be used between the turbine or rotor (e.g., 62) and the generator (e.g., 74). This may allow the generator to operate at its optimum RPM, regardless of the rotor RPM. The CVT may be of a friction, hydrostatic, or ratcheting type, as examples, and may be installed within shaft 73 of wind generator 70, for example.

In particular embodiments, the diffuser 16y and concentrator 16w sections are symmetric to allow the wind generator to be operational when the wind is blowing in either of two substantially opposite directions. Wind generator 70 is an example of such an embodiment. In various embodiments, venturi 66 may rotate on tower 72, or tower 72 may rotate on base 75 to compensate for different wind directions. Other embodiments (e.g., the embodiment shown in FIG. 4) do not provide for the ability to rotate to face the wind. But even without the ability to rotate, since concentrator 16w and diffuser 16y have the same shape (are symmetric) in the embodiment shown in FIG. 7, wind generator 70 may equally utilize winds whether blowing in the predominant wind direction 15 or in the opposite direction, which may be a significant advantage in locations where winds tend to alternate between two substantially opposite directions, such as certain coastal locations.

Embodiments that provide rotation may include bearing elements such as ball bearings or roller bearings to reduce friction between the rotating members. In some embodiments, fins are provided and the venturi is allowed to rotate so as to adapt itself to the wind direction for maximum funneling effect. Other embodiments may measure wind direction and then actively rotate the venturi. A wind vane device may be mounted at the concentrator, throat or diffuser, for example, to provide the necessary input of wind direction to actively rotate the venturi into the wind. In some embodiments, the bearings have travel stops to limit the rotation of the venturi (e.g. +/−30 degrees).

In a number of embodiments, a plurality of venturis and wind turbines may be assembled into a wind farm or power production facility. FIGS. 1 and 2 illustrate an example of such a wind farm, wind farm 10, having wind turbines 12a to 12d and 14a to 14c with venturis 16a to 16d and 18a to 18c. Wind farm 10 also has venturiless primary wind turbines 11a to 11d and 13a to 13d, but other embodiments may have a venturi for each wind turbine. As examples, various embodiments may lack the primary wind turbines (e.g., 11a to 11d and 13a to 13d) described herein or may contain primary wind turbines having venturis.

In various embodiments, venturis (e.g., 16a to 16d) and wind turbines (e.g., 12a to 12d) may be mounted in rows (e.g., row 12) or other patterns adjacent to each other. In some embodiments, the venturis may be fixed (e.g., as shown in FIG. 4), while in other embodiments (e.g., as shown in FIG. 7 and described above), the venturis may rotate to face the wind. In some embodiments, use of venturis may allow closer spacing of wind turbines than prior art venturiless wind turbines. In embodiments where the venturis rotate, the venturis (e.g., 16a to 16d) may be mounted too close to each other (e.g., spacing or interval 11ab may be too small) in some embodiments to allow them to rotate all of the way around, but they may be configured to rotate a limited distance in certain embodiments to line up with the wind, for example.

In other embodiments, the venturis may be spaced far enough apart (from each other or from other objects, (e.g., spacing or interval 11ab may be large enough) to allow them to rotate all of the way around or nearly all of the way around. Such embodiments may have different shaped concentrators 16w and diffusers 16y (e.g., as shown in FIG. 3). In some embodiments, rotation of the venturi may be caused by vanes, for example, on the venturi housing which may be pushed by the wind. Some embodiments may have brakes or damping mechanisms to prevent the venturi from moving when not desired or from moving back and forth or hunting. In some embodiments, vanes may rotate into the venturi when not in use. In some embodiments, a powered rotation system may be used to track the wind, for example, an electric or hydraulic system.

In particular embodiments where the venturi is not movable (does not rotate), a plurality of entrances may be provided to direct the wind to the turbine when the wind is coming from different angles to accommodate winds blowing in different directions. Such entrances or venturis may be arranged, for example, in a radial or spiral pattern. Further, various embodiment of the invention use a converging and diverging nozzle that includes a concentrator (converging section) 16w and a diffuser (diverging section) 16y. However, some embodiments of the invention may have a concentrator 16w but not a diffuser 16y, or a large concentrator 16w and a small diffuser 16y, for instance.

In order to reduce separation losses, particularly when using symmetric concentrator 16w and diffuser 16y sections, it may be beneficial in certain embodiments to use baffles or gates as boundary layer control slots. Such boundary layer control slots may reduce boundary layer separation, eliminate back flow which may be produced by using a concentrator section as a diffuser, or both, for example.

Figure 8:
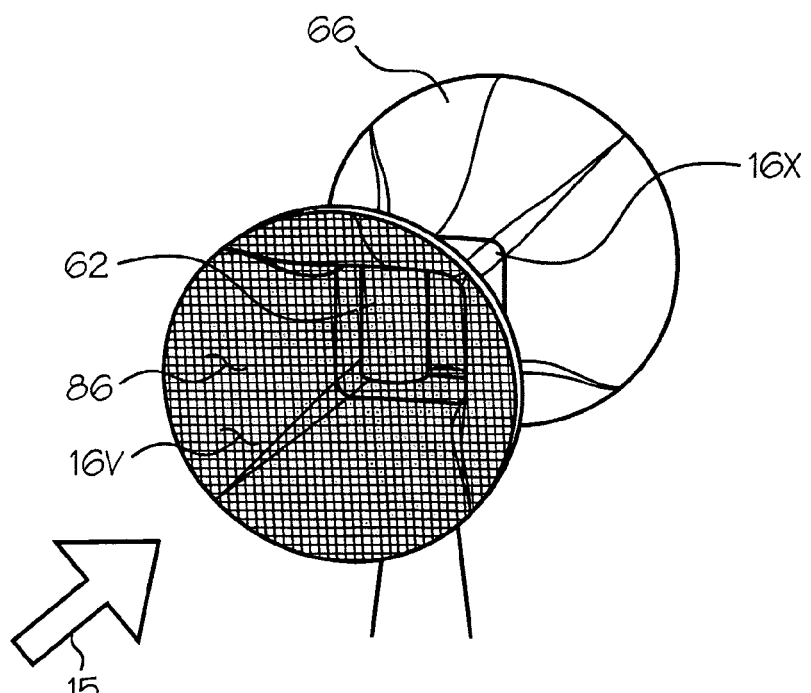
FIG. 8 is an isometric view of the venturi and Savonius rotor of FIG. 7 at another angle and showing a screen over the entrance to the venturi.

FIG. 8 illustrates that some embodiments may have a square or rectangular cross-section throat 16x rather than round, for example. Vertical axis turbines such as Savonius rotor 62 may have a square or rectangular cross-section throat 16x, for instance. The embodiment illustrated has a circular entrance 16v and a circular exit 16z, and smooth transitions therebetween. But other embodiments may have a square or rectangular entrance 16v, exit 16z, or both. Some embodiments may have a polygonal cross section at throat 16x, entrance 16v, exit 16z, or a combination thereof. Some or all cross sections (e.g., viewed from the side or top) may have a fifth degree or higher polynomial shape, in various embodiments.

FIG. 8 also illustrates a screen 86 placed over inlet or entrance 16v of venturi 66. Screen 86 may keep birds away from the rotor 62, preventing the injuring or killing of the birds, a common occurrence in conventional wind turbines (e.g., primary wind turbines 11a to 11d and 13a to 13d). In some embodiments, screens 86 may also protect bats, insects, squirrels, raccoons, ringtails, monkeys, other animals, or people, from rotor 62, or may protect rotor 62 from damage from such creatures or from blowing debris, for example. In some embodiments, screen 86 may be selected to minimize entrance losses, streamline the airflow, or both. Referring to FIGS. 1, 2, 3, and 6, some embodiments may have a screen on exit 16z. One or more screens (e.g., 86), a shroud or venturi, or a combination thereof, may form an enclosure, for example, enclosure 17b surrounding secondary turbine 12b shown in FIG. 2. In some embodiments, enclosures may completely surround wind turbines, while in other embodiments, enclosures may partially surround the wind turbines, for example, at the inlet 16v or near the ground 25.

Figure 9:
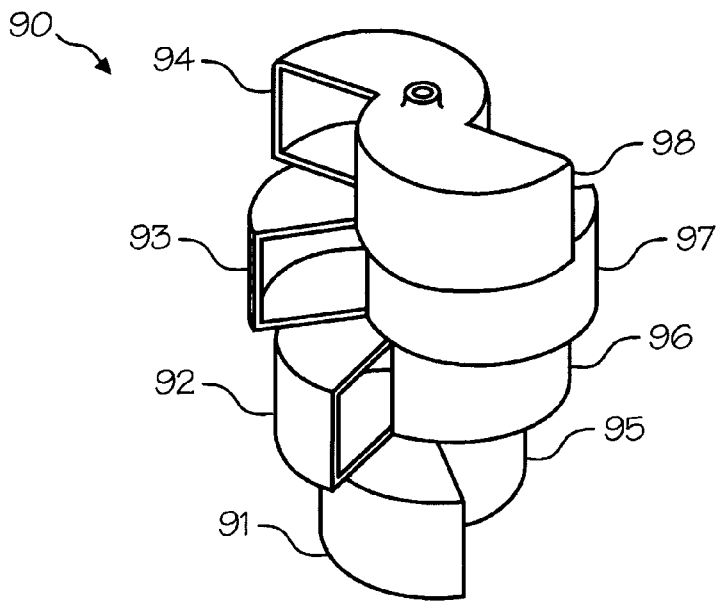
FIG. 9 is an isometric view of an improvement to a Savonius rotor that is an alternate rotor for some embodiments of the invention.

Next, several improvements to the Savonius style rotor are contemplated for various embodiments of the invention. In the embodiment 90 illustrated in FIG. 9, for example, each bucket is divided into sections 91 to 94 and 95 to 98 and each section is rotationally staggered with respect to its adjacent section. This configuration allows each set of buckets to align with the flow successively so as to generate continuous power and reduce noise generated, vibration, harmonics, and the like. In such an embodiment, the rotor may start off with a first bucket aligned with the flow. As the first bucket rotates 45 degrees, a second bucket aligns with the air flow and so on. Thus, at any given time, three out of the eight buckets assist in rotation, generating more-continuous power.

Figure 10:
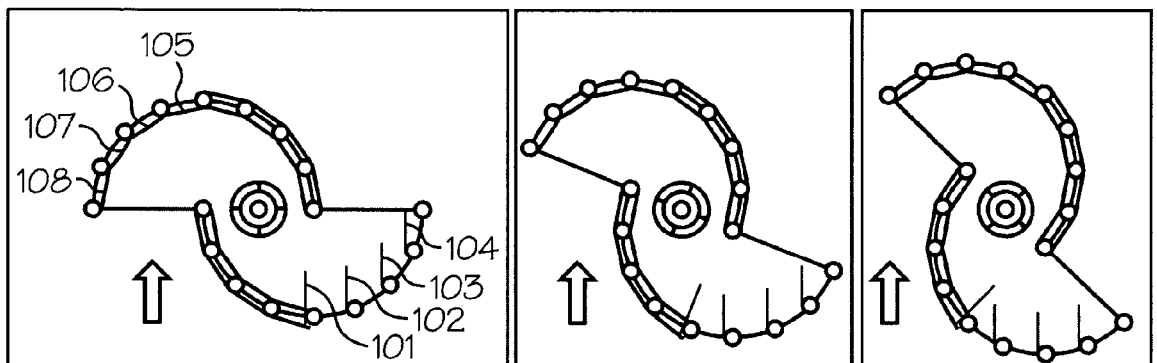
FIG. 10 includes five top views of another improvement to a Savonius rotor that is an alternate rotor for some embodiments of the invention.
Figure 10:
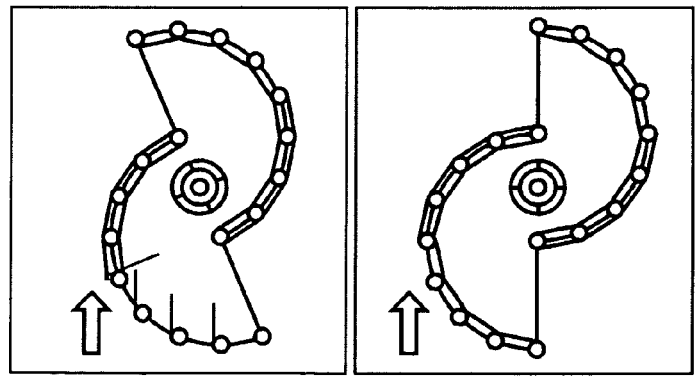

In certain embodiments, one disadvantage of using a Savonius rotor is that a part of the productive output of the filled bucket gets wasted by the drag caused by the returning bucket rotating upstream into the wind. In a particular embodiment shown in FIG. 10, the buckets are divided into slats or segments 101 to 108 that pivot about a vertical axis (i.e., of a vertical axis turbine) as shown. The slats 101 to 108 then rotate or swing out of the way as the returning bucket rotates into the wind as shown in FIG. 10 parts a to e.

Other embodiments of the invention use other types of turbines such as axial flow turbines (e.g., turbine 42 shown in FIG. 4), radial flow turbines, or mixed flow turbines. Turbines may have one or more rows of rotating vanes and one or more rows of stationary vanes, in various embodiments. In some embodiments, the turbine may be a Francis turbine, for example, and in some embodiments, the turbine may be a Kaplan turbine and may have variable-pitch blades. In comparison to prior art wind turbines, such as primary turbines 11a to 11d and 13a to 13d, the wind turbines of this invention may rotate at higher rotational speeds. This may facilitate direct connection to smaller, higher-speed generators (e.g., 22g, 24g or 74, which may reduce cost. In other embodiments, a speed increaser may be provide to facilitate use of a smaller generator.

In various embodiments the generator (e.g., generator 22g or 24g shown in FIG. 2 or 74 shown in FIG. 7) may be a variable speed generator and may produce direct current or alternating current that is rectified to direct current. The direct current may then be inverted to produce alternating current at the desired frequency. In some embodiments, a high-frequency current may be produced first, which may then be transformed to a desired voltage before being rectified and inverted to the desired frequency, for example, 60 or 50 cycles per second. Other embodiments may have fixed-speed AC generators, multiple speed AC generators, or DC generators, as other examples.

Wind turbines are dependent on the wind for power generation, and various embodiments may include systems and methods for storage of energy for use when wind is less available. Such systems and methods of energy storage may include, for example, pumping water to a higher elevation and then generating electricity when the water is returned to the lower elevation, storing electricity in batteries or electrochemical capacitors, producing hydrogen through electrolysis of water which is later burned in an internal combustion engine or gas turbine or consumed in a fuel cell, or a combination thereof. In embodiments in which hydrogen is produced, power from the wind turbine may also be used to compress the hydrogen for storage in pressure vessels, cool the hydrogen to form liquid hydrogen, or both.

Certain embodiments of the invention are configured to harness solar energy as well as wind energy, and may include a solar collection system utilizing the venturi (e.g., 16a to 16d, 18a to 18c, 36, 66, or others) for harnessing solar energy. In different embodiments, the venturi is used to reflect sunlight onto a solar collector, the venturi is used to support a plurality of photovoltaic cells, or both, as examples. For instance, photovoltaics may be mounted on the surface or support structure of the venturi and used to generate electricity. FIG. 2 illustrates an example of such an embodiment, wherein solar panel 28 of photovoltaics mounted on venturi 18c is electrically connected to an electrical power collection system 26, which provides electrical power to grid 27. Such photovoltaics may be single-crystal or amorphous silicon solar cells, for example. In some embodiments, part or all of the venturi may be used to concentrate solar radiation, for example, to focus the sunlight on photovoltaics, to boil water into steam to drive a turbine, to make hydrogen by disassociation of water, to power a Sterling-cycle engine, or to provide process heat, as examples.

Various embodiments further include an electrical power collection system (e.g., 26 shown in FIG. 2) which may be configured to collect electrical power from the electrical generator and from the solar collection system (e.g., solar panel 28) and deliver the electrical power to an electrical power distribution grid (e.g., 27). In some embodiments, the electrical collection system 26 may collect electrical power from several wind turbines (e.g., primary wind turbines 11a to 11d and 13a to 13d and secondary wind turbines 12a to 12d and 14a to 14c), several pieces of solar generating equipment (e.g., panel 28), or a combination thereof. The production of solar and wind power at the same location may reduce the need for land in comparison with having separate wind and solar facilities, and electrical collection system 26 may use some of the same equipment for transforming voltage, rectifying or inverting (or both) to obtain the desired frequency, frequency control, transmission, switching, over-current, over-voltage, or circuit protection, filtering, power factor manipulation, metering or measurement, recording of data, and the like. Further, production of solar and wind energy may reduce the percentage of time that the system is not able to produce any power since the sun may be shining when the wind is not blowing, and vice versa.

As mentioned, various embodiments of the invention may be connected to a large electrical distribution grid (e.g., grid 27). But other embodiments of the invention may be used at a remote site (e.g., remote from other power availability or from an electrical power distribution grid) to power equipment such as communications equipment, weather monitoring equipment, flood or tsunami warning equipment, earthquake monitoring equipment, dam or aqueduct controls or monitoring equipment, light houses, fire towers, mining equipment, traffic controls, lighting, flow meters, or the like, or may provide power to remote structures such as homes, cabins, businesses, road side rest stops, etc. Embodiments of the invention may be used on other planets such as Mars or Venus, for example, for powering scientific or communications equipment and the like. Embodiments of the invention may be used to produce electricity on or for structures or vehicles, for instance, to charge batteries, provide propulsion, power auxiliary systems, provide lighting, operate refrigerators, provide ventilation, and the like. Such vehicles may include, as examples, trucks, cars, trains, golf carts, motor homes, and ships at sea, for instance.

Figure 11:
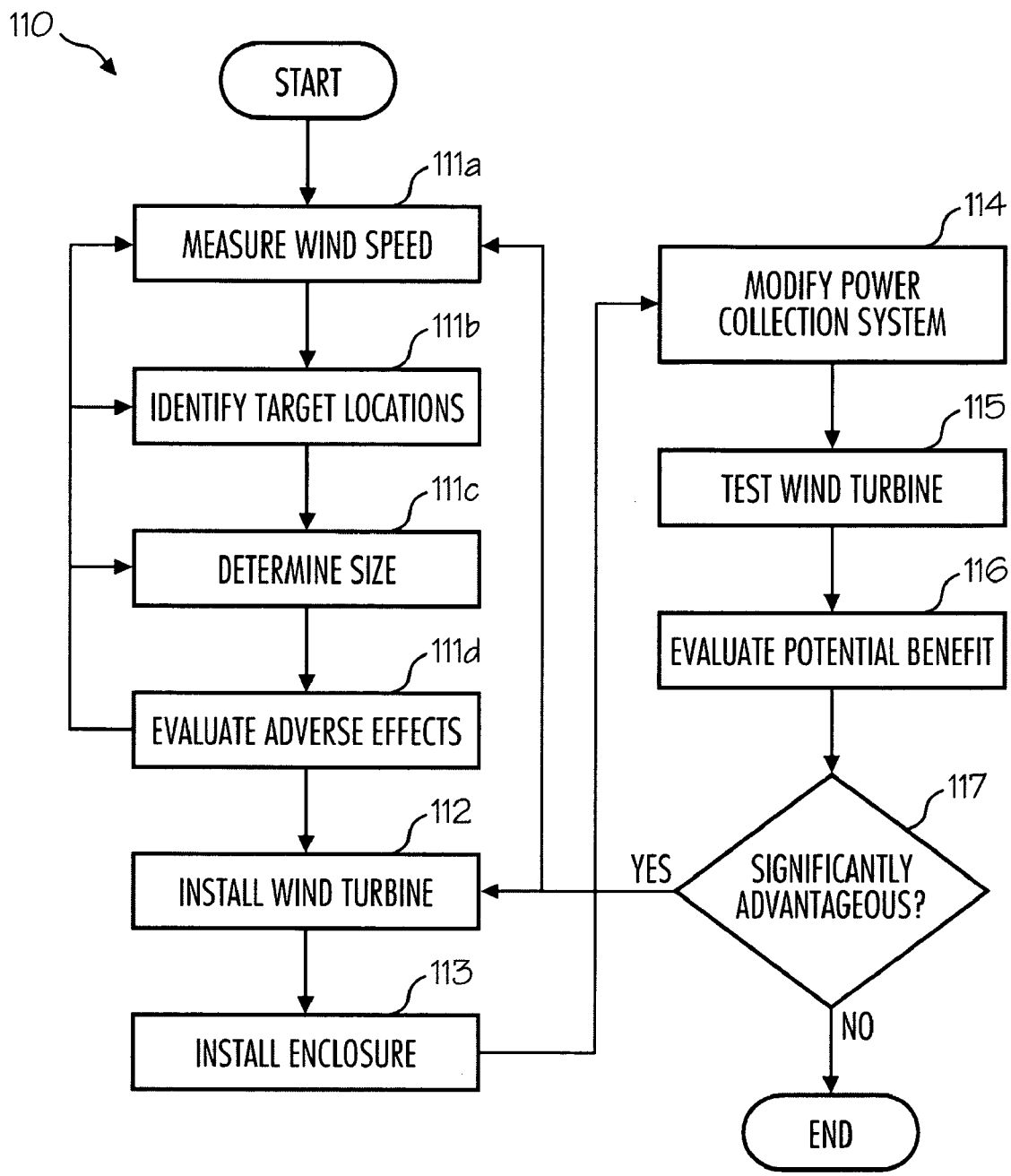
FIG. 11 is a flow chart illustrating steps and an example of an arrangement of various methods in accordance with the invention, including, among other things, methods of improving the power production capability of a new or existing wind farm.

Turning now from a description predominantly of systems and apparatuses to a description predominantly of methods, FIG. 11 illustrates a particular example of a method in accordance with the invention, method 110. Various embodiments of the invention may have various combinations of steps shown in FIG. 11, described herein, or known in the art, as examples, in various sequences. Method 110 is an example of, among other things, various methods of improving the power production capability of a new or existing wind farm, for instance.

In the embodiment illustrated, method 110 includes a step of measuring the wind speed (step 111a) in a wind farm. In various embodiments, measurements may be taken (e.g., step 111a) at a plurality of locations (e.g., within the wind farm) and at a plurality of times (e.g., over minutes, hours, days, weeks, months, years, or even decades in some cases). Measurements may be taken (step 111a) with various types of wind measurement instrumentation and may be collected, recorded, and analyzed to identify (step 111b) one or more (e.g., a plurality) of target locations within the wind farm where the wind speed is substantially greatest or favorable for installation of a secondary wind turbine. In many embodiments, measurements may be taken (step 111a) at the actual site, which may be an existing wind farm, for example, wind farm 10 having primary wind turbines 11a to 11d, 13a to 13d, or both, (e.g., without secondary wind turbines 12a to 12d and 14a to 14c). In some embodiments a model of the wind farm may be constructed for analysis (e.g., taking measurements for step 111a), a wind farm may be analyzed using computer modeling, or both. In some embodiments, one or more predominant wind directions (e.g., 15) may be identified or confirmed.

In some cases, wind speed at target locations (e.g., identified in step 111b) may be greater than the free stream or surrounding wind velocities, for example, on average or at least during particular time periods. In some embodiments, target locations may be limited to locations where installing a secondary turbine is feasible, for example, close to the ground, a certain distance from primary or other wind turbines or structures, etc. In some embodiments, target locations may be identified (step 111b) based on experience, analyses of other wind farms, computer modeling, or other analytical tools besides directly measuring wind speed (step 111a). While in some embodiments, target locations may be predicted using such tools and then verified or more-accurately pinpointed or quantified through physical wind-speed measurements (step 111a). In some embodiments, one target location is initially identified (step 111b). In other embodiments, a plurality or many target locations are initially identified (step 111b). In some embodiments, software may be written or used to measure wind speeds (step 111a), identify target locations (step 111a), or both.

Various embodiments may include a step of determining a size (step 111c), for example, of a secondary turbine to install at one or more of the target locations. In some embodiments, a plurality or all of the secondary turbines may have the same size, and the step of determining the size (step 111c) may involve selecting an appropriate size that will work at several target locations. The size determined (step 111c) may be or include, a secondary turbine blade diameter, a venturi inlet or entrance (e.g., 16v) diameter, area, or shape, a venturi or turbine height (e.g., 22h, 16hl, or 18hh), a turbine speed, a generator power rating, etc. or a combination thereof, as examples.

A number of embodiments may also include a step of evaluating whether the secondary turbine (e.g., once installed at the target location) will cause any adverse effects (step 111d), for example, by disturbing wind flow to any of the primary turbines (e.g., 11a to 11d or 13a to 13d). Such adverse effects (identified in step 111d) (if any) may be weighed against potential benefits anticipated or calculated from a secondary turbine (e.g., of the size determined in step 111c) installed at the target location. Some embodiments may include iterating between some or all of steps 111a and 111d, for example, between steps 111c and 111d. Thus, if adverse effects (e.g., evaluated in step 111d) are found to be excessive size may be reevaluated (e.g., in step 111c), or in some cases new target locations may be identified (step 111b), which may require new measurements to be taken (e.g., in step 111a).

Many embodiments may also include installing (e.g., secondary) wind turbines (step 112), for example, at one or more of the target locations. For instance, some embodiments include installing at least one of wind turbines 12a to 12d and 14a to 14c shown in FIG. 1, for example, after manufacturing or obtaining the secondary wind turbines. In some embodiments, primary wind turbines 11a to 11d, 13a to 13d, or a combination thereof, may already be existing, already be in service or both. In other embodiments, the wind farm may be new, and wind turbines may be installed (step 112) in a location that did not previously have wind turbines 11a to 11d or 13a to 13d, for example.

In some embodiments, the wind farm may have at least two primary wind turbines (e.g., 11a and 11b shown in FIG. 1), and may have a prevailing or predominant wind direction (e.g., 15). In various embodiments, such a method includes a step of obtaining, providing, installing, or a combination thereof (e.g., step 112) at least one secondary wind turbine having a substantially smaller size (e.g., determined in step 111c in some embodiments) than either of the primary wind turbines. In addition, some embodiments include a step of installing the secondary wind turbine (step 112) at a target location that may be in between (i.e., when looking downwind from the predominant wind direction 15), down wind of (e.g., with reference to predominant wind direction 15), or substantially below (or a combination thereof the primary wind turbines. In some embodiments, the target location may be in between, down wind of, and substantially below the primary wind turbines, for example. For example, referring to FIGS. 1 and 2, secondary wind turbine 2a may be installed (step 112) such that height 22h of substantially less than height 21h of primary wind turbine 11a or 11b (as shown).

In a number of embodiments, the wind farm includes a row (e.g., row 11) of at least three primary wind turbines (e.g., 11a to 11c or 11d), and at least a plurality of the secondary wind turbines (e.g., 12a and 12b, or even 12c) are obtained or provided (e.g., in step 112). In addition, in some embodiments, each secondary wind turbine (e.g., 12a and 12b, or even 12c) has a substantially smaller size than at least a plurality of the primary wind turbines (e.g., at least a plurality of 11a to 11c or 11d), and the secondary wind turbines are installed (e.g., in step 112) in a row (e.g., row 12) substantially parallel to the row (e.g., row 11) of primary wind turbines (e.g., 11a to 11c or 11d). Furthermore, for purposes of this particular language, "in between" means when looking downwind from the predominant wind direction 15. For example, in the embodiment shown in FIGS. 1 and 2, secondary wind turbines 12a to 12c have each been installed (step 112) where they are in between, down wind of, and substantially below (e.g., in elevation) two of the primary wind turbines (e.g., 11a to 11d).

Further, in the embodiment shown in FIG. 1, the row 11 of primary wind turbines 11a to 11d has been installed (step 112) so that it is substantially perpendicular to the predominant wind direction 15. Still further, the secondary wind turbines shown in FIG. 1 have been installed (step 112) in a plurality of rows (e.g., row 12 and 14) that are each substantially parallel to the rows of primary wind turbines (e.g., 11 and 13). In addition, row 12 of secondary wind turbines has been installed (step 112) in between the two rows 11 and 13 of the primary wind turbines in this embodiment.

Various embodiments further include a step of providing, obtaining, or installing (or a combination thereof an enclosure (step 113), which may be a venturi, for example. In some embodiments, the enclosure or venturi may be installed (step 113) around the secondary wind turbine, while in other embodiments, the secondary wind turbine may be installed (step 112) within the enclosure or venturi (e.g., at the target location). In other words, steps 112 and 113 may be performed in either order (or at the same time) in different embodiments. In particular embodiments, the enclosure (e.g., installed in step 113) may have one or more screens, which may be installed, for example, covering entrance 16v, exit 16z or both. In some embodiments, the screen or screens may be part of a shroud, enclosure, or venturi, for instance. In different embodiments, the screen and other parts of the enclosure may partially or completely enclose the wind turbine.

In some embodiments, a power collection system (e.g., system 26 shown in FIG. 2) may be modified, provided, or constructed (step 114) to collect power from the secondary turbines (e.g., 12a to 12d and 14a to 14c) and provide that power to an electrical distribution grid (e.g., grid 27). For example, in an embodiment in which wind field 10 is modified to add secondary wind turbines 12d and 14c, power collection system 26 is modified to add portions of collection system 26 or conductors 26d and 24d shown in FIG. 2. In some embodiments, the providing, modifying, or constructing (step 114) of collection system 26, for example, may include sub steps such as rectifying, inverting DC to AC of the desired frequency, transforming to change voltage, filtering to eliminate harmonics, providing circuit protection, etc., and equipment for such purposes may be provided, added, or used, for example. In embodiments that have solar generation, the collection system (e.g., system 26) may be obtained, constructed, or modified (step 114) to collect power from the solar generation equipment as well.

Various embodiments may include a step of testing the one or more (e.g., secondary) wind turbines (step 115), for example, that was installed (step 112). The wind turbine may be fitted with instrumentation, monitoring equipment, and the like, and tested (step 115) off of the grid (e.g., disconnected from grid 27), while connected to the grid, or, in many embodiments, both. In some embodiments, the wind turbine may be tested to evaluate how it performs if suddenly disconnected from the grid, or in other critical situations that may occur during subsequent use. In some embodiments, the potential benefit of one or more recently installed (e.g., in step 112) wind turbines may be evaluated (step 116), for instance, to see if power production is as anticipated, to see whether the one or more recently installed (e.g., in step 112) wind turbines is cost effective, to see whether the one or more recently installed (e.g., in step 112) wind turbines has adverse effects on other wind turbines (e.g., whether or not anticipated in step 111d) or the like.

In some embodiments, if one or more recently installed (e.g., in step 112) wind turbines is found to be significantly advantageous (step 117), then more wind turbines may be installed (step 112), for example, at other target locations. In some embodiments, this may involve measuring additional wind speeds (step 111a), identifying additional target locations (step 111b), determining appropriate sizes (step 111c), evaluating adverse effects on other turbines (step 111d), or a combination thereof, for example. In various embodiments, one or more additional wind turbines may then be installed (step 112), the power collection system modified (step 114), and the wind turbines may be tested (step 115) and evaluated (step 116). In some embodiments, this process may be repeated, for example, until it appears to not be significantly advantageous (step 117) to install additional wind turbines (step 112) within the wind farm, for instance. This process may be repeated for different wind farms or, for example, when there are changes in demands for electrical power, changes in price of electrical power, changes in wind conditions, changes in capital costs, changes in incentives for using renewable energy sources, changes in regulations or penalties for producing pollution or contributing to the production of greenhouse gasses, changes in public perception of use of renewable energy sources, advances in wind turbine technology, changes in equipment costs, or the like.

Some elements, parameters, measurements, functions, components, and the like may be described herein as being required, but may only be required in certain embodiments. Further, benefits, other advantages, and solutions to problems have been described herein with regard to specific embodiments. However, the benefits, advantages, solutions to problems, and element(s) that may cause benefit, advantage, or solution to occur or become more pronounced are not to be construed as critical, required, or essential features or elements of the claims or the invention. Reference to an element in the singular is not intended to mean "one and only one" unless explicitly so stated, but rather "one or more." As used herein, the terms "comprises", "comprising", or a variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A method of improving the power production capability of a wind farm, the wind farm having at least two primary wind turbines and a predominant wind direction, the method comprising at least the steps of:
   obtaining at least one secondary wind turbine having a substantially smaller size than either of the primary wind turbines;
   installing the secondary wind turbine in between, down wind of, and substantially below the primary wind turbines; and
   obtaining a venturi; and
   wherein the step of installing the secondary wind turbine includes installing the secondary wind turbine within the venturi.

2. The method of claim 1 wherein the wind farm comprises a row of at least three primary wind turbines, and wherein the step of obtaining at least one secondary wind turbine comprises obtaining at least a plurality of secondary wind turbines, each secondary wind turbine having a substantially smaller size than at least a plurality of the primary wind turbines, and wherein the step of installing the secondary wind turbines comprises installing the secondary wind turbines in a row substantially parallel to the row of at least three primary wind turbines, and wherein at least a plurality of the secondary wind turbines are each in between, down wind of, and substantially below two of the primary wind turbines.

3. The method of claim 2 wherein the row of at least three primary wind turbines is substantially perpendicular to the predominant wind direction.

4. The method of claim 2 wherein the wind farm comprises a plurality of substantially parallel rows of at least three primary wind turbines in each row, and wherein the step of installing the secondary wind turbines comprises installing the secondary wind turbines in a plurality of rows of secondary wind turbines that are each substantially parallel to the rows of primary wind turbines, and wherein at least one of the rows of secondary wind turbines is in between two rows of the primary wind turbines.

5. A method of improving the power production capability of a wind farm, the wind farm having at least two primary wind turbines and a predominant wind direction, the method comprising at least the steps of:
   obtaining at least one secondary wind turbine having a substantially smaller size than either of the primary wind turbines;
   installing the secondary wind turbine in between, down wind of, and substantially below the primary wind turbines; and
   obtaining an enclosure having at least one screen; and
   wherein the step of installing the secondary wind turbine includes at least one of installing the secondary wind turbine within the enclosure or installing the enclosure around the secondary wind turbine.

6. A method of improving the power production capability of an existing wind farm, the wind farm having a plurality of primary wind turbines, the method comprising in the following order at least the steps of:
- measuring the wind speed in the wind farm at a plurality of locations and at a plurality of times;
- identifying a plurality of target locations within the wind farm where the wind speed is substantially greatest, at least during particular time periods; and installing secondary wind turbines at at least some of the plurality of target locations; and
- obtaining an enclosure having at least one screen; and
- wherein the step of installing the secondary wind turbine includes at least one of installing the secondary wind turbine within the enclosure or installing the enclosure around the secondary wind turbine.

7. The method of claim 6 further comprising, before the step of installing secondary wind turbines, a step of evaluating whether installing secondary wind turbines at the target locations would adversely effect the primary wind turbines.

8. The method of claim 6 further comprising, before the step of installing secondary wind turbines, a step of determining an appropriate size of the secondary wind turbines.

9. The method of claim 6 wherein the target locations are in between the primary wind turbines when viewed looking down wind from a predominant wind direction.

10. The method of claim 6 wherein the target locations are down wind from the primary wind turbines with reference to a predominant wind direction.

11. The method of claim 6 wherein the target locations are at a lower elevation than the primary wind turbines.

12. A method of improving the power production capability of an existing wind farm, the wind farm having a plurality of primary wind turbines, the method comprising in the following order at least the steps of:
- measuring the wind speed in the wind farm at a plurality of locations and at a plurality of times;
- identifying a plurality of target locations within the wind farm where the wind speed is substantially greatest, at least during particular time periods;
- installing secondary wind turbines at at least some of the plurality of target locations; and
- installing a plurality of venturis at the plurality of target locations.

13. A wind farm for generating electricity from wind, the wind farm comprising:
- a plurality of primary wind turbines, each primary wind turbine having a primary wind turbine height above a ground surface and each primary wind turbine comprising a primary electrical generator;
- a plurality of secondary wind turbines, each secondary wind turbine having a secondary wind turbine height above a ground surface, wherein the average secondary wind turbine height is substantially less than an average primary wind turbine height, and each secondary wind turbine comprising a secondary electrical generator;
- an enclosure at least partially surrounding each secondary wind turbine; and
- an electrical power collection system configured to collect electrical power from the primary electrical generators and from the secondary electrical generators and deliver the electrical power to an electrical power distribution grid; and
- wherein each enclosure comprises a venturi, each venturi having a venturi height above the ground surface, each venturi having a concentrator section extending from an entrance opening to a throat, the entrance opening having a substantially greater cross-sectional area than the throat, wherein each secondary wind turbine is located at the throat of one of the venturis.

14. The wind farm of claim 13 wherein a plurality of the venturis include a diffuser section, each diffuser section extending from the throat to an exit opening, the exit opening having a substantially greater cross-sectional area than the throat.

15. The wind farm of claim 13 further comprising a screen covering the entrance opening.

16. The wind farm of claim 13 wherein at least part of the concentrator section has the shape of at least a fifth-degree polynomial curve.

17. The wind farm of claim 13 wherein the primary wind turbines and the secondary wind turbines are alternately arranged in the wind farm.

18. A wind farm for generating electricity from wind, the wind farm comprising:
- a plurality of primary wind turbines, each primary wind turbine having a primary wind turbine height above a ground surface and each primary wind turbine comprising a primary electrical generator;
- a plurality of secondary wind turbines, each secondary wind turbine having a secondary wind turbine height above a ground surface, wherein the average secondary wind turbine height is substantially less than an average primary wind turbine height, and each secondary wind turbine comprising a secondary electrical generator;
- an enclosure at least partially surrounding each secondary wind turbine; and
- an electrical power collection system configured to collect electrical power from the primary electrical generators and from the secondary electrical generators and deliver the electrical power to an electrical power distribution grid; and
- wherein the primary wind turbines are arranged in at least one primary wind turbine row and the secondary wind turbines are arranged in at least one secondary wind turbine row and the at least one secondary wind turbine row is substantially parallel to the at least one primary wind turbine row.

19. A wind farm for generating electricity from wind, the wind farm comprising:
- a plurality of primary wind turbines, each primary wind turbine having a primary wind turbine height above a ground surface and each primary wind turbine comprising a primary electrical generator;
- a plurality of secondary wind turbines, each secondary wind turbine having a secondary wind turbine height above a ground surface, wherein the average secondary wind turbine height is substantially less than an average primary wind turbine height, and each secondary wind turbine comprising a secondary electrical generator;
- an enclosure at least partially surrounding each secondary wind turbine; and
- an electrical power collection system configured to collect electrical power from the primary electrical generators and from the secondary electrical generators and deliver the electrical power to an electrical power distribution grid; and
- wherein the primary wind turbines are arranged in a plurality of primary wind turbine rows and the secondary wind turbines are arranged in a plurality of secondary wind turbine rows wherein the secondary wind turbine rows and the primary wind turbine rows are substantially parallel and alternately arranged.

20. The wind farm of claim 19 wherein the primary wind turbine rows and the secondary wind turbine rows are each substantially perpendicular to a prevailing wind direction.

21. A wind farm for generating electricity from wind, the wind farm comprising:
- a plurality of primary wind turbines, each primary wind turbine having a primary wind turbine height above a ground surface and each primary wind turbine comprising a primary electrical generator;
- a plurality of secondary wind turbines, each secondary wind turbine having a secondary wind turbine height above a ground surface, wherein the average secondary wind turbine height is substantially less than an average primary wind turbine height, and each secondary wind turbine comprising a secondary electrical generator;
- an enclosure at least partially surrounding each secondary wind turbine; and
- an electrical power collection system configured to collect electrical power from the primary electrical generators and from the secondary electrical generators and deliver the electrical power to an electrical power distribution grid; and
- wherein the primary wind turbines are venturiless and each include a variable-pitch multi-blade propeller mounted on a tower.

22. A wind farm for generating electricity from wind, the wind farm comprising:
- a plurality of primary wind turbines, each primary wind turbine having a primary wind turbine height above a ground surface and each primary wind turbine comprising a primary electrical generator;
- a plurality of secondary wind turbines, each secondary wind turbine having a secondary wind turbine height above a ground surface, wherein the average secondary wind turbine height is substantially less than an average primary wind turbine height, and each secondary wind turbine comprising a secondary electrical generator;
- an enclosure at least partially surrounding each secondary wind turbine; and
- an electrical power collection system configured to collect electrical power from the primary electrical generators and from the secondary electrical generators and deliver the electrical power to an electrical power distribution grid; and
- wherein each enclosure comprises at least one screen.

* * * * *